(12) United States Patent
Chowdhury

(10) Patent No.: US 12,304,159 B2
(45) Date of Patent: May 20, 2025

(54) APPARATUS, SYSTEM AND METHOD FOR APPLYING COMPOSITE LAYUPS

(71) Applicant: The Boeing Company, Chicago, IL (US)

(72) Inventor: Nayeem Chowdhury, Melbourne (AU)

(73) Assignee: The Boeing Company, Arlington, VA (US)

( * ) Notice: Subject to any disclaimer, the term of this patent is extended or adjusted under 35 U.S.C. 154(b) by 26 days.

(21) Appl. No.: 17/719,656

(22) Filed: Apr. 13, 2022

(65) Prior Publication Data

US 2023/0330950 A1  Oct. 19, 2023

(51) Int. Cl.
  *B29C 70/34* (2006.01)
  *B29C 70/54* (2006.01)
  *B29L 31/30* (2006.01)

(52) U.S. Cl.
  CPC ............ *B29C 70/34* (2013.01); *B29C 70/541* (2013.01); *B29L 2031/3076* (2013.01)

(58) Field of Classification Search
  CPC ... B25J 15/0616; B25J 15/0052; B29C 53/04; B29C 31/08; B29C 70/541; B29C 70/38
  See application file for complete search history.

(56) References Cited

U.S. PATENT DOCUMENTS

| | | | |
|---|---|---|---|
| 7,819,392 B2 | 10/2010 | Kuroda et al. | |
| 9,090,028 B2 | 7/2015 | McCarville et al. | |
| 10,052,827 B2 | 8/2018 | Rotter et al. | |
| 10,081,140 B2 | 9/2018 | Paesano et al. | |
| 10,603,848 B2 | 3/2020 | Brennan et al. | |
| 2004/0231480 A1* | 11/2004 | Wattles | B26D 3/10 83/401 |
| 2022/0143874 A1* | 5/2022 | Madsen | B29D 99/0025 |

FOREIGN PATENT DOCUMENTS

| | | | | |
|---|---|---|---|---|
| DE | 10 2007020898 | | 10/2007 | |
| EP | 3 705 275 | | 9/2020 | |
| WO | WO-0207937 A2 * | | 1/2002 | A22C 17/0093 |

OTHER PUBLICATIONS

Becker (English Translation of DE102014209904) (Year: 2014).*
European Patent Office, Extended European Search Report, App. No. 23153955.2 (Sep. 20, 2023).

* cited by examiner

*Primary Examiner* — Michael A Tolin
*Assistant Examiner* — Hana C Page
(74) *Attorney, Agent, or Firm* — Walters & Wasylyna LLC

(57) ABSTRACT

An apparatus includes a support platform and a plurality of passive actuators coupled to the support platform. Each one of the plurality of passive actuators includes a shaft. The shaft includes a first shaft end and a second shaft end, opposite the first shaft end. Each one of the plurality of passive actuators includes a gripper coupled to the second shaft end. The shaft is freely movable relative to the support platform in a first direction along an axis of linear shaft movement. Movement of the shaft relative to the support platform in a second direction, opposite the first direction, along the axis of linear shaft movement is automatically inhibited.

24 Claims, 17 Drawing Sheets

APPARATUS, SYSTEM AND METHOD FOR APPLYING COMPOSITE LAYUPS

FIELD

The present disclosure relates generally to fabrication of composite parts and, more particularly, to an apparatus, a system, and a method for applying layers of composite material to surface having complex geometries.

BACKGROUND

Composites laminates and structures are used in a wide variety of applications, including the manufacture of aircraft, spacecraft, rotorcraft, watercraft, automobiles, and other vehicles and structures, due to their high strength-to-weight ratios, corrosion resistance, and other favorable properties. In aircraft manufacturing and assembly, such composite laminates and structures are used in increasing quantities to form the fuselage, wings, tail section, skin panels, and other components.

Aerospace manufacturers increasingly use composite laminates in an effort to reduce the weight and increase the performance of some components. Composite laminates used by the aerospace industry typically include a fiber-reinforced composite material. Fiber-reinforced composite materials of this type generally include two essential components, namely a fibrous material and a polymer matrix which surrounds the fibrous material. Conventional methods for manufacturing fiber-reinforced composite laminates include sequentially laying up a stack of composite plies (e.g., a number of ply layers) over a forming tool to form a composite layup. Heat and/or pressure may be applied to the composite layup to consolidate and/or cure the matrix of the composite layup into a final composite laminate.

The composite plies may take the form of large sheets of fibrous material, which are picked up and placed on the forming tool in an overlapping arrangement to form the composite layup. Manual placement of the sheets (e.g., a hand layup process) is time consuming and labor intensive, leading to high production costs and low production rates. It may also be difficult to properly shape large sheets over a forming tool that has a contoured forming surface or other complex geometry. Automated ply layup systems use a robot and an end effector for picking and placing the sheets on the forming tool. However, automated ply layup systems require the use of numerous pieces of expensive capital equipment. For example, the end effector may include a number of active actuators that grip the sheet and place the sheet at predetermined locations on the forming tool. The working components of the active actuators increase the cost, weight, and complexity of the end effector. Additionally, a system for controlling the position (e.g., extension) of each one of the active actuators must be set up prior to initiation of the automated pick and place operation. Furthermore, the number of active actuators over a given area is limited due to the size of the active actuators, which limits the ability of the end effector to accurately conform the sheet to the contour of the forming tool.

Accordingly, those skilled in the art continue with research and development efforts in the field of composite fabrication.

SUMMARY

Disclosed are examples of an apparatus for applying a composite layup, a passive actuator, a system for applying a composite layup, a method for applying a composite layup, and a method for shaping a composite layup. The following is a non-exhaustive list of examples, which may or may not be claimed, of the subject matter according to the present disclosure.

In an example, the disclosed apparatus includes a support platform and a plurality of passive actuators coupled to the support platform. Each one of the plurality of passive actuators includes a shaft. The shaft includes a first shaft end and a second shaft end, opposite the first shaft end. Each one of the plurality of passive actuators includes a gripper coupled to the second shaft end. The shaft is freely movable relative to the support platform in a first direction along an axis of linear shaft movement. Movement of the shaft relative to the support platform in a second direction, opposite the first direction, along the axis of linear shaft movement is automatically inhibited.

In an example, the disclosed passive actuator includes a housing. The passive actuator includes a collar coupled to the housing. The passive actuator includes a shaft received by the collar and extending through the housing. The passive actuator includes a gripper coupled to the shaft. The collar automatically locks in response to linear movement of the shaft in a first direction along an axis of linear shaft movement. With the collar locked, the collar enables further linear movement of the shaft in the first direction and inhibits linear movement of the shaft in a second direction, opposite the first direction, along the axis of linear shaft movement. The collar is selectively unlockable to enable linear movement of the shaft in the second direction.

In an example, the disclosed system includes a tool. The tool includes a tool surface. The system includes a support platform that is positionable relative to the tool surface. The system includes a plurality of passive actuators coupled to the support platform. Each one of the plurality of passive actuators includes a shaft. The shaft includes a first shaft end and a second shaft end, opposite the first shaft end. Each one of the plurality of passive actuators includes a gripper coupled to the second shaft end. The shaft is freely movable relative to the support platform in a first direction along an axis of linear shaft movement in response to engagement of the gripper with the tool surface. Movement of the shaft relative to the support platform in a second direction, opposite the first direction, along the axis of linear shaft movement is automatically inhibited.

In an example, the disclose method for applying a composite layup includes steps of: (1) holding a composite sheet over a layup surface using a plurality of passive actuators, the layup surface includes a first layup-surface portion and a second layup-surface portion that is noncoplanar with the first layup-surface portion; (2) placing a first sheet portion of the composite sheet against the first layup-surface portion of the layup surface; (3) passively retracting a first portion of the plurality of passive actuators in response to engagement of the first sheet portion with the first layup-surface portion; (4) placing a second sheet portion of the composite sheet against the second layup-surface portion of the layup surface; and (5) passively retracting a second portion of the plurality of passive actuators in response to engagement of the second sheet portion with the second layup-surface portion.

In an example, the disclosed method for shaping a composite layup includes steps of: (1) holding a composite sheet over a layup surface using a plurality of passive actuators, each one of the plurality of passive actuators having an extended length; (2) moving the plurality of passive actuators and the layup surface toward each other; and (3) shaping the composite sheet against the layup surface in response to passive retraction of the plurality of passive actuators from the extended length to a retracted length.

Other examples of the disclosed apparatus, passive actuator, system, and methods will become apparent from the following detailed description, the accompanying drawings, and the appended claims.

DETAILED DESCRIPTION

Figure 1:
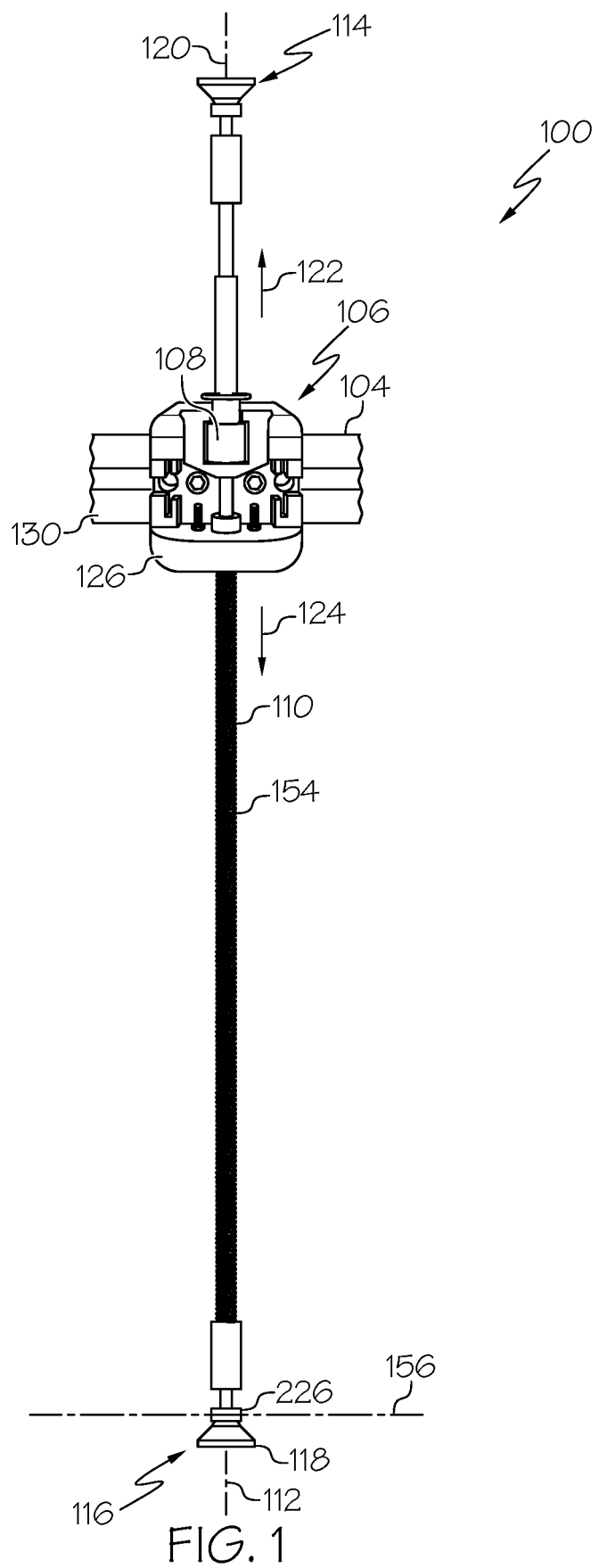
FIG. 1 is a schematic, elevation view of an example of a passive actuator of an apparatus for applying composite layups.

Referring generally to FIGS. 1-22, the present disclosure is directed to examples of an apparatus 100 for applying a composite layup 300. The present disclosure is also directed to examples of a passive actuator 106 of the apparatus 100. The present disclosure is further directed to a system 200 for applying the composite layup 300. Generally, the apparatus 100 forms a portion of the system 200 (e.g., as shown in FIGS. 3, 5 and 7-22).

Referring to FIGS. 1-6, which schematically illustrate examples of the apparatus 100. In one or more examples, the apparatus 100 includes a support platform 104 and a plurality of passive actuators 106. The plurality of passive actuators 106 is coupled to the support platform 104. Only a portion of the support platform 104 is illustrated by example in FIGS. 1, 2, 4 and 6. Only one of the plurality of passive actuators 106 is illustrated by example in FIGS. 1 and 2. Throughout the present disclosure, singular reference to the passive actuator 106 may refer to any one of or each one of the plurality of passive actuators 106.

In one or more examples, the apparatus 100 serves as or takes the form of an end effector for an automated ply layup system. The apparatus 100 is utilized for automated picking and placing of a composite sheet 302 on a layup surface 210 to form and shape the composite layup 300. In one or more examples, the apparatus 100 uses the plurality of passive actuators 106 to pick up the composite sheet 302 that is planar (e.g., flat) and place the composite sheet 302 on the layup surface 210 that is non-planar (e.g., curved). In one or more examples, the apparatus 100 uses the plurality of passive actuators 106 to pick up the composite sheet 302 that is non-planar and place the composite sheet 302 on the layup surface 210 that is non-planar.

Advantageously, the apparatus 100 does not use or rely on individual controlled actuation (e.g., extension) of a plurality of active actuators to set the positions of the active actuators for placing and shaping the composite sheet 302. Instead, the apparatus 100 relies on engagement of the plurality of passive actuators 106 against the layup surface 210 that, in turn, sets the positions of the passive actuators 106 for placing and shaping the composite sheet 302. Use of the passive actuators 106 facilitates a significant reduction in the weight of the end effector of an automated ply layup system per unit area compared to an equivalent number of active actuators. Use of the passive actuators 106 also enables an increase in the rate of production by eliminating the control set-up required for active actuators. Use of the passive actuators 106 further enables an increase in the number of gripping locations on the composite sheet 302 over a given area, which increases the accuracy of shaping the composite sheet 302 to the contour of the layup surface 210.

Generally, the composite layup 300 includes a number of the composite sheets 302. The composite sheets 302 are sequentially placed to form ply layers of the composite layup 300. The composite sheets 302 of the composite layup 300 may have the same of different fiber orientations. The composite sheets 302 are laid up in a predetermined sequence and are placed at specific (e.g., predetermined) locations on the layup surface 210 during the layup process.

In one or more examples, the composite sheet 302 is a ply of fibrous composite material, such as cut from a roll. In one or more examples, the composite sheet 302 is dry fabric, such as woven or nonwoven fabric. In these examples, the composite layup 300 is referred to as a dry layup and a polymer or resin matrix is then infused through the dry layup. In one or more examples, the composite sheet 302 is a fabric that is pre-impregnated with a polymer or resin matrix, also referred to as a prepreg. In these examples, the composite layup 300 is referred to as a wet layup.

While layup of composite sheets is described in the illustrated examples, the disclosed examples may be employed to layup or place other objects, and especially those in the form of flexible sheet-like or flat materials, including without limitation, plastics, ceramics, metals, and composites in various forms. Accordingly, as used herein, the terms "sheet" and "ply" may include a wide variety of shapes and materials.

Figure 3:
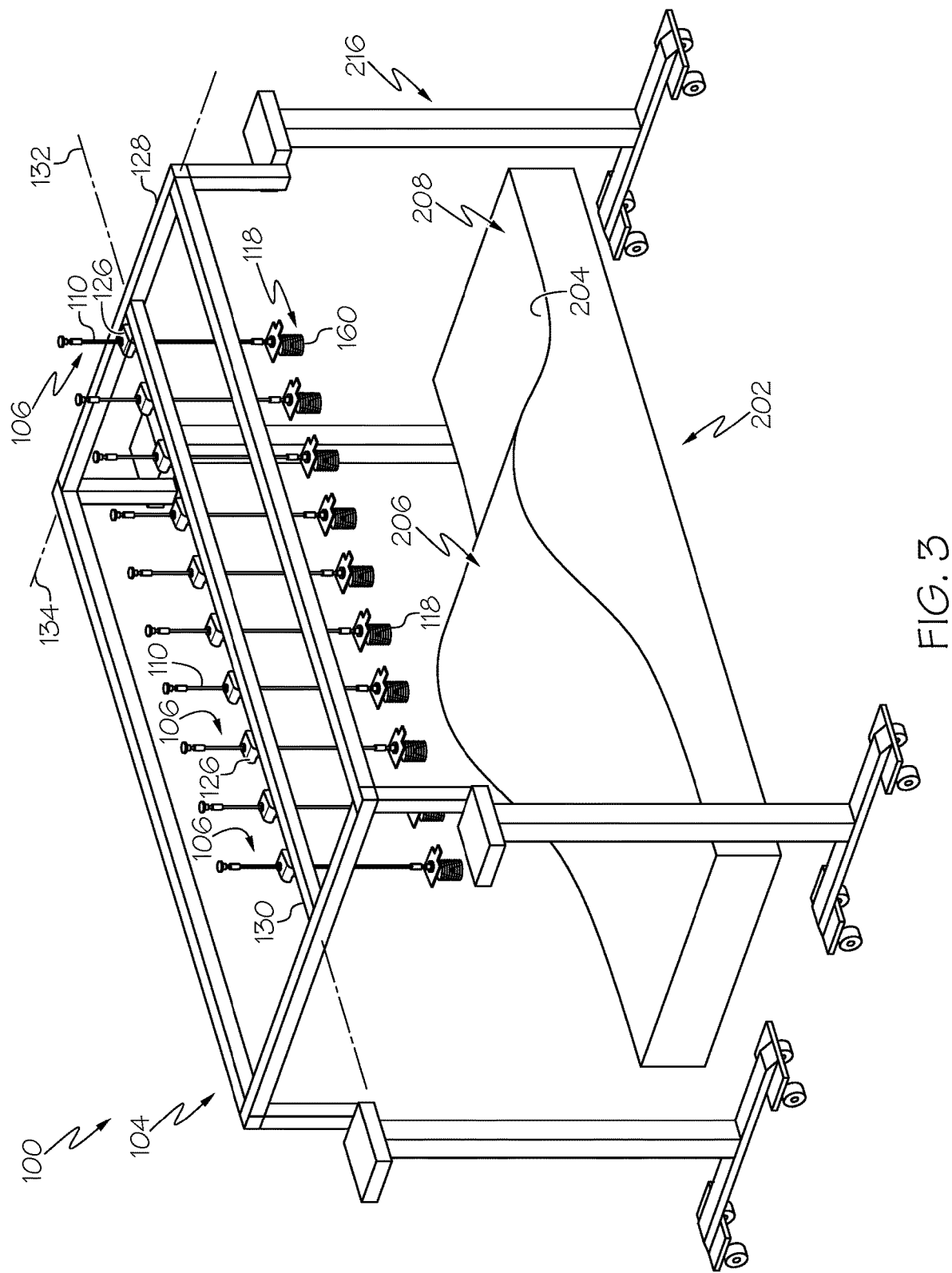
FIG. 3 is a schematic, perspective view of an example of the apparatus for applying composite layups.
Figure 5:
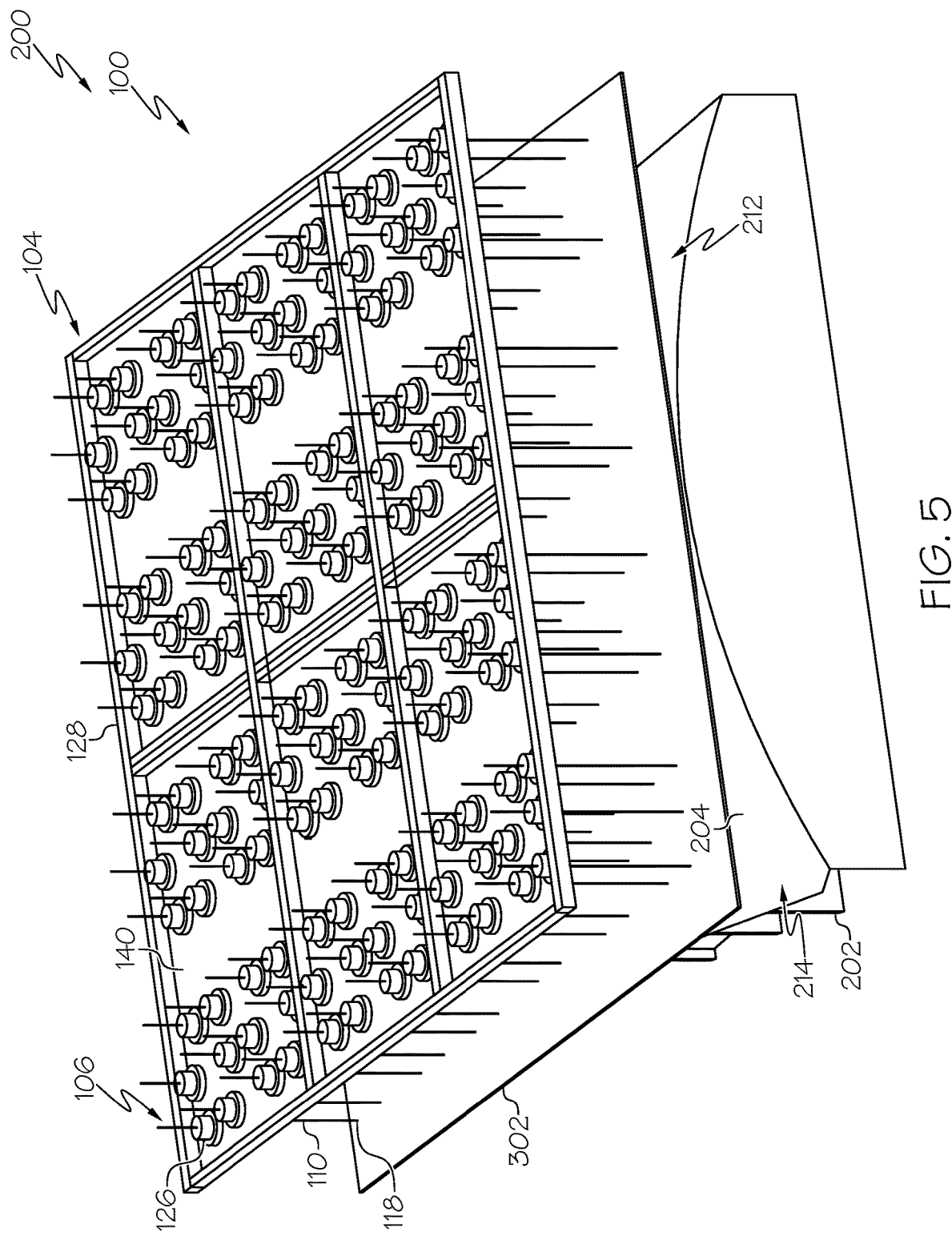
FIG. 5 is a schematic, perspective view of an example of the apparatus for applying composite layups.

For the purpose of the present disclosure, the layup surface 210 refers to any surface upon which the composite sheet 302 is placed and shaped. As an example, when placing and shaping an initial composite sheet, the layup surface 210 is a tool surface 204 of a tool 202 (e.g., as shown in FIGS. 3 and 5). As another example, when placing and shaping a subsequent composite sheet, the layup surface 210 is an exposed surface of an immediate previously placed and shaped composite sheet.

Figure 2:
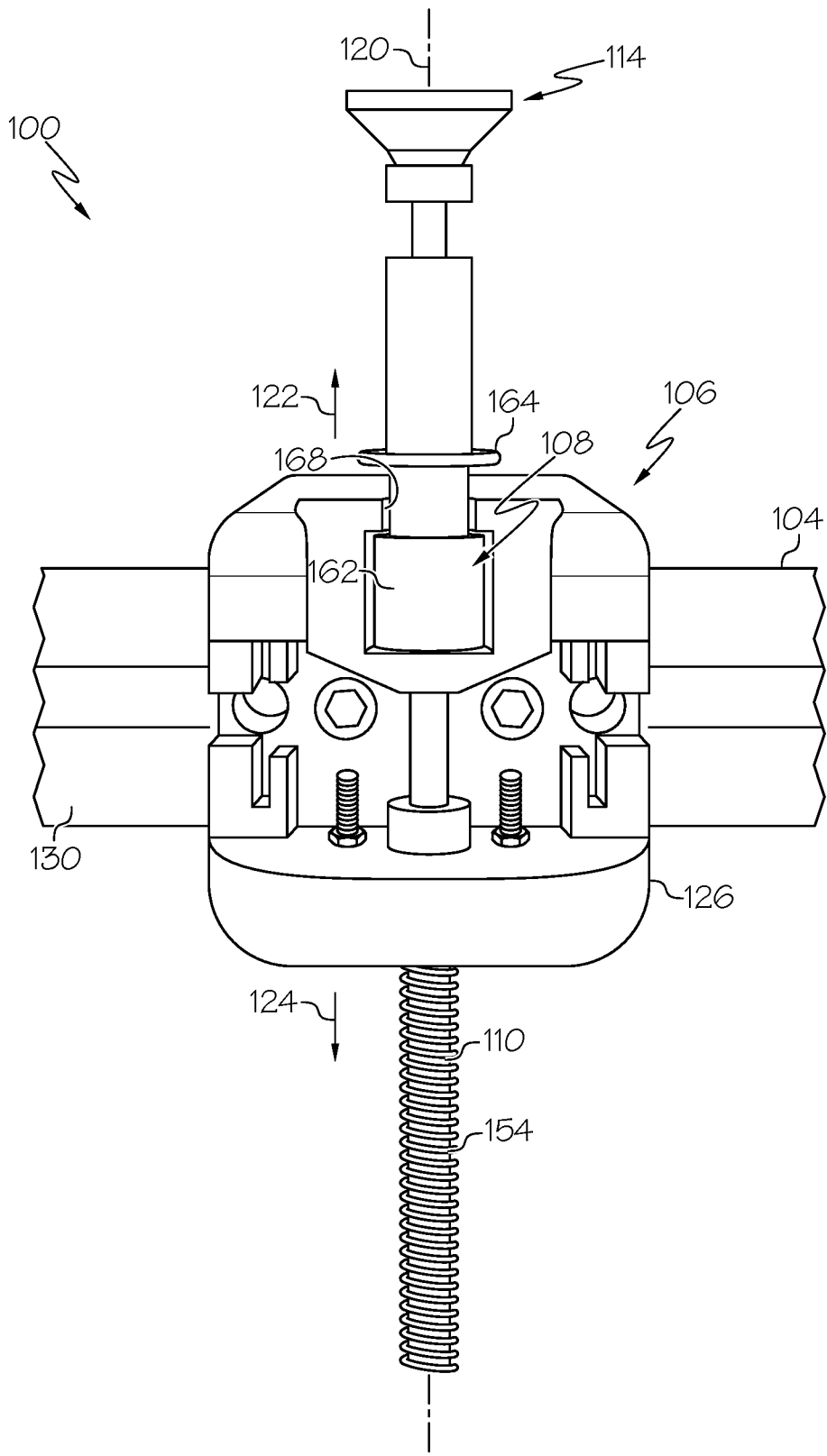
FIG. 2 is a schematic, elevation view of an example of a portion of the passive end effector shown in FIG. 1.

FIGS. 1 and 2 schematically illustrate examples of the passive actuator 106. Generally, the passive actuator 106 is or refers to a device that has a dynamic behavior and produces controlled motion without drawing energy from a power supply (e.g., electrical power, hydraulic power, pneumatic power, etc.). In other words, motion (e.g., retraction and extension) of the passive actuator 106 is initiated and controlled in response to an external force acting on the passive actuator 106. In one or more examples, the passive actuator 106 is a linear actuator. In one or more examples, the passive actuator 106 is configured to move between an extended position (e.g., fully extended position or full extension) and a retracted position (e.g., an at least partially retracted position, partial retraction, or full retraction).

In one or more examples, the passive actuator 106 includes a shaft 110. The shaft 110 includes a shaft axis 112. The shaft 110 includes a first shaft end 114 and a second shaft end 116, opposite the first shaft end 114 along the shaft axis 112. The shaft 110 is any suitable elongated member and may include or be referred to as a rod, a pole, a stem, a bar, and the like. In one or more examples, the shaft 110 has a circular cross-sectional shape, viewed along the shaft axis 112.

Generally, extension and retraction of the passive actuator 106 is defined by linear movement of the shaft 110 relative to the support platform 104, along an axis of linear shaft movement 120. The axis of linear shaft movement 120 and the shaft axis 112 are parallel to or coincident with each other.

For the purpose of the present disclosure, reference to retraction of the passive actuator 106 and/or retraction of the shaft 110 refers to linear movement of the shaft 110 and, thus, linear movement of the second shaft end 116 in a first direction 122 (e.g., a retraction direction) along an axis of linear shaft movement 120 that reduces a length of the passive actuator 106 and/or the shaft 110.

For the purpose of the present disclosure, reference to extension of the passive actuator 106 and/or extension of the shaft 110 refers to linear movement of the shaft 110 and, thus, linear movement of the second shaft end 116 in a second direction 124 (e.g., an extension direction), opposite the first direction 122, along axis of linear shaft movement 120 that increases the length of the passive actuator 106 and/or the shaft 110.

The shaft 110 is freely movable relative to the support platform 104 in the first direction 122 along the axis of linear shaft movement 120. Thus, the passive actuator 106 is free to retract (e.g., freely move from an extended position to a retracted position and from a lesser retracted position to a further retracted position).

For the purpose of the present disclosure, the phrases free movement, freely movable, freely moves, free to move, and similar or like phrases refer to unimpeded motion or movement.

For the purpose of the present invention, the phrase retracted position refers to or includes an at least partially retracted position, a fully retracted position, or any other position that is not the fully extended position.

For the purpose of the present invention, the phrase extended position refers or includes a fully extended position.

In the extended position, the passive actuator 106 and/or the shaft 110 may be considered to have an extended length (e.g., a fully extended length). In the retracted position, the passive actuator 106 and/or the shaft 110 may be considered to have a retracted length (e.g., a partially retracted length).

Movement of the shaft 110 relative to the support platform 104 in the second direction 124 along the axis of linear shaft movement 120 is automatically inhibited. Thus, the passive actuator 106 automatically restricts or prevents extension (e.g., movement from a retracted position back to an extended position or from a further retracted position to a lesser retracted position).

Movement of the shaft 110 in the second direction 124 is selectively enabled or permitted. Thus, the passive actuator 106 selectively permits extension (e.g., movement from a retracted position back to an extended position or from a further retracted position to a lesser retracted position).

Referring still to FIGS. 1 and 2, in one or more examples, the passive actuator 106 includes a gripper 118. The gripper 118 is coupled to the shaft 110 at the second shaft end 116. The gripper 118 is configured to attach to and securely hold a portion of a surface of the composite sheet 302. The gripper 118 is also configured to selectively release the composite sheet 302. The gripper 118 includes or takes the form of any one of various suitable gripping devices.

Figure 4:
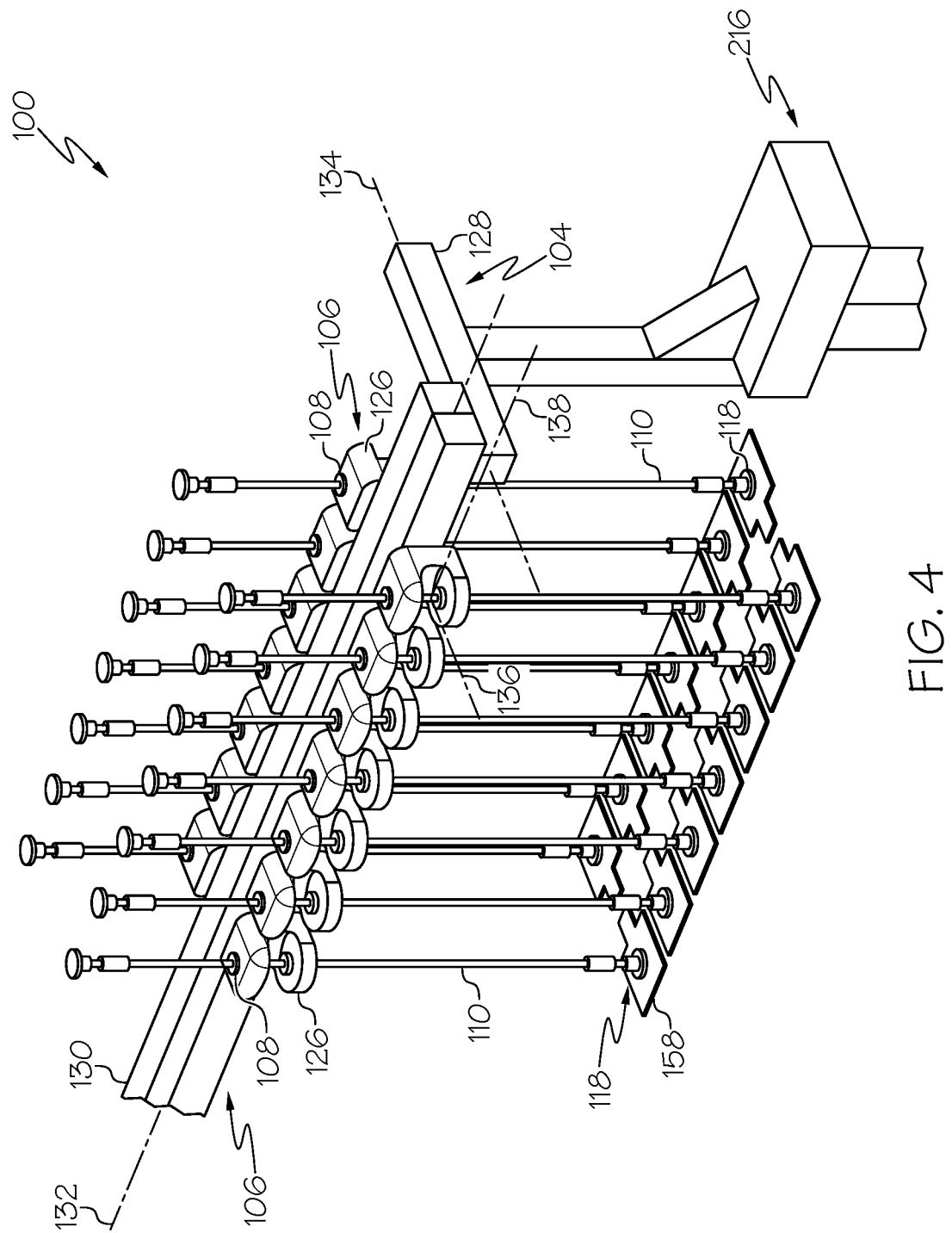
FIG. 4 is a schematic, perspective view of an example of a portion of the apparatus for applying composite layups.

Referring briefly to FIG. 4, in one or more examples, the gripper 118 includes, or takes the form of, an electrostatic gripper 158. The electrostatic gripper 158 includes at least one electroadhesive pad that uses electrostatic adhesion, or electroadhesion, to provide a sufficient adhesion force between the electrostatic gripper 158 and the composite sheet 302 to lift, hold, and move the composite sheet 302. Generally, the electroadhesive pad includes a conductor that acts as an electrode and that is laminated with a layer of dielectric. The electrostatic gripper 158 is energized by a high voltage DC supply (not shown). Upon energizing, the static charges start accumulating on the electrostatic gripper 158. When the electrostatic gripper 158 is brought near the composite sheet 302, the composite sheet 302 gets polarized due to electrostatic induction and, thus, gets adhered to the electrostatic gripper 158.

Referring briefly to FIG. 3, in one or more examples, the gripper 118 includes, or takes the form of, a vacuum gripper 160. The vacuum gripper 160 includes at least one vacuum cup, suction cup, or vacuum plate that uses the difference between atmospheric pressure and a vacuum to provide a sufficient adhesion force between the vacuum gripper 160 and the composite sheet 302 to lift, hold, and move the composite sheet 302. The vacuum, or vacuum flow is generated by an electromechanical pump or a compressed air-driven pump (not shown).

Referring back to FIG. 1, in one or more examples, the gripper 118 is rotationally or pivotally movable relative to the second shaft end 116 of the shaft 110 about at least one axis of rotational gripper movement 156. The axis of rotational gripper movement 156 is perpendicular to the axis of linear shaft movement 120 and/or the shaft axis 112. As an example, the gripper 118 is coupled to the second shaft end 116 of the shaft 110 by movable joint 226, such as a pivot joint, a swivel joint, a rotational joint, or the like. Pivotal or rotational movement of the gripper 118 relative to the shaft 110 enables the gripper 118 to self-orient or self-align to the composite sheet 302 and/or to the contour of the layup surface 210.

Referring again to FIGS. 1 and 2, in one or more examples, the passive actuator 106 includes a collar 108. The shaft 110 is received by the collar 108. The collar 108 enables free linear movement of the shaft 110 relative to the collar 108 in the first direction 122 and, thus, retraction of the passive actuator 106. The collar 108 engages the shaft 110 to automatically inhibit linear movement of the shaft 110 relative to the collar 108 in the second direction 124 and, thus, prevent extension of the passive actuator 106. The collar 108 selectively releases the shaft 110 to enable linear movement of the shaft 110 in the second direction 124 and, thus, selectively enables extension of the passive actuator.

In one or more examples, the collar 108 automatically locks in response to linear movement of the shaft 110 in the first direction 122 along the axis of linear shaft movement 120. With the collar 108 locked, the collar 108 enables further linear movement of the shaft 110 in the first direction 122 and inhibits linear movement of the shaft 110 in the second direction 124. The collar 108 is selectively unlockable to enable linear movement of the shaft 110 in the second direction 124.

Referring to FIG. 2, in one or more examples, the collar 108 includes a collar body 162 and a collar lock 164. The shaft 110 is received by and extends through the collar body 162 and the collar lock 164. The collar lock 164 is coupled to the collar body 162 and a portion of the collar lock 164 is received by the collar body 162. The collar lock 164 is movable relative to the collar body 162 between a locked position and an unlocked position. In the locked position, the collar lock 164 engages the shaft 110 to inhibit movement of the shaft 110 relative to the collar 108 in the second direction 124 (e.g., extension of the passive actuator 106) while permitting movement of the shaft 110 in the first direction 122 (e.g., retraction of the passive actuator 106). In the unlocked position, the collar lock 164 disengages the shaft 110 to permit movement of the shaft 110 relative to the collar 108 in the second direction 124 (e.g., extension of the passive actuator 106). In one or more examples, linear movement of the shaft 110 in the first direction 122 moves the collar lock 164 in the locked position.

An example of the collar 108 is a FastLock quick release shaft locking collar, commercially available from Magnetic Technologies, LTD. of Oxford, Massachusetts. Another example of the collar 108 is a QUIKLOC™ shaft collar, commercially available from QUIKLOC™ of Lincoln, New Hampshire.

Referring again to FIGS. 1 and 2, in one or more examples, the passive actuator 106 includes a housing 126. The housing 126 is coupled to the support platform 104. The collar 108 is coupled to the housing 126. The shaft 110 extends through the housing 126.

The housing 126 may be coupled to the support platform 104 by any one of various suitable techniques, such as by mechanical fasteners, clips, clamps, pins, and the like. The housing 126 may have any suitable shape depending, for example, how the housing 126 is coupled to the support platform 104.

In one or more examples, the housing 126 is linearly movable relative to the support platform 104. Linear movement of the housing 126 relative to the support platform 104 enables linearly movement of the passive actuator 106 relative to support platform 104. Linear movement of the passive actuator 106 enables the passive actuator 106 to be properly located at a desired or predetermined location relative to the composite sheet 302 and/or relative to the layup surface 210.

In one or more examples, the housing 126 is rotationally movable relative to the support platform 104. Rotational movement of the housing 126 relative to the support platform 104 enables rotational movement of the passive actuator 106 relative to support platform 104. Rotational movement of the passive actuator 106 enables the passive actuator 106 to be properly oriented at a desired angular orientation relative to the composite sheet 302 and/or relative to the layup surface 210.

The collar 108 may be coupled to the housing 126 by any one of various suitable techniques. In one or more examples, at least a portion of the collar 108 is situated within the housing 126. In one or more examples, the collar lock 164 extends through the housing 126 or is otherwise exposed to enable access to the collar lock 164 for movement of the collar lock 164 from the locked position to the unlocked position. For example, the housing 126 may include a housing opening formed through an upper end of the housing 126. At least a portion of the collar lock 164 extends from the housing 126 through the housing opening.

Referring still to FIGS. 1 and 2, in one or more examples, the passive actuator 106 is biased in the extended position or is biased toward extension. The collar 108 overcomes the bias to inhibit extension of the passive actuator 106. For example, the shaft 110 is biased in the second direction 124 along the axis of linear shaft movement 120.

In one or more examples, the passive actuator 106 includes a spring 154. The spring 154 is coupled to the shaft 110 and to the housing 126. The spring 154 is configured to bias the second shaft end 116 in the second direction along the axis of linear shaft movement 120. In an example, the spring 154 is a coil spring that is situated around the shaft 110 between a lower end of the housing 126 and the second shaft end 116. Linear movement of the shaft 110 in the first direction 122 and, thus, retraction of the passive actuator 106 compresses the spring 154. The spring 154 resists linear movement of the shaft 110 in the first direction 122 and, thus, retraction of the passive actuator 106. In one or more examples, the spring 154 applies a forming or shaping force (e.g., a predetermined force) to the composite sheet 302 when being placed against the layup surface 210. Upon the collar 108 being unlocked, the spring 154 assists in movement of the shaft 110 in the second direction 124 and, thus, extension of the passive actuator 106.

FIGS. 3 and 4 schematically illustrate examples of the apparatus 100. In one or more examples, the support platform 104 includes a frame 128 and a rail 130. The rail 130 is coupled to the frame 128. The housing 126 of the passive actuator 106 (e.g., of each one of the plurality of passive actuators 106) is coupled to the rail 130. In one or more examples, the rail 130 is a linear guide rail.

In one or more examples, the rail 130 is movable relative to the frame 128. For example, the rail 130 is linearly movable relative to the frame 128 along an axis of linear rail movement 134. Movement of the rail 130 relative to frame 128 enables selective positioning of an entirety of the plurality of passive actuators 106 coupled to the rail 130, for example, in directions along an X-axis.

In one or more examples, the passive actuator 106 (e.g., at least one of the plurality of passive actuators 106) is linearly movable relative to the rail 130. For example, the housing 126 of the passive actuator 106 is linearly movable relative to the rail 130 along an axis of linear housing movement 132. The axis of linear housing movement 132 extends along a length of the rail 130. In one or more examples, the axis of linear housing movement 132 is perpendicular to the axis of linear rail movement 134. Linear movement of the housing 126 along the axis of linear housing movement 132 enables selective positioning of each one or any one of the plurality of passive actuators 106 along the rail 130, for example, in directions along a Y-axis. Linear movement of the passive actuator 106 enables the passive actuator 106 to be properly located at a desired or predetermined location relative to the composite sheet 302 and/or relative to the layup surface 210.

In one or more examples, the passive actuator 106 (e.g., at least the one of the plurality of passive actuators 106) is rotationally movable relative to the rail 130. For example, the housing 126 of the passive actuator 106 is rotationally movable relative to the rail 130 about an axis of rotational housing movement 136 (e.g., as shown in FIG. 4). In one or more examples, the axis of rotational housing movement 136 is perpendicular to the axis of linear housing movement 132 and/or is perpendicular to the axis of linear shaft movement 120. Rotational movement of the housing 126 about the axis of rotational housing movement 136 enables selective orienting of each one or any one of the plurality of passive actuators 106 relative to the rail 130, for example, about the X-axis. Rotational movement of the passive actuator 106 enables the passive actuator 106 to be properly oriented at a desired angular orientation relative to the composite sheet 302 and/or relative to the layup surface 210.

In one or more examples, the housing 126 of the passive actuator 106 (e.g., of at least the one of the plurality of passive actuators 106) is rotationally movable relative to the rail 130 about a second axis of rotational housing movement 138. In one or more examples, the second axis of rotational housing movement 138 is parallel to the axis of linear housing movement 132 and/or is perpendicular to the axis of linear shaft movement 120. Rotational movement of the housing 126 about the second axis of rotational housing movement 138 enables selective orienting of each one or any one of the plurality of passive actuators 106 relative to the rail 130, for example, about the Y-axis. Rotational movement of the passive actuator 106 enables the passive actuator 106 to be properly oriented at a desired angular orientation relative to the composite sheet 302 and/or relative to the layup surface 210.

Figure 6:
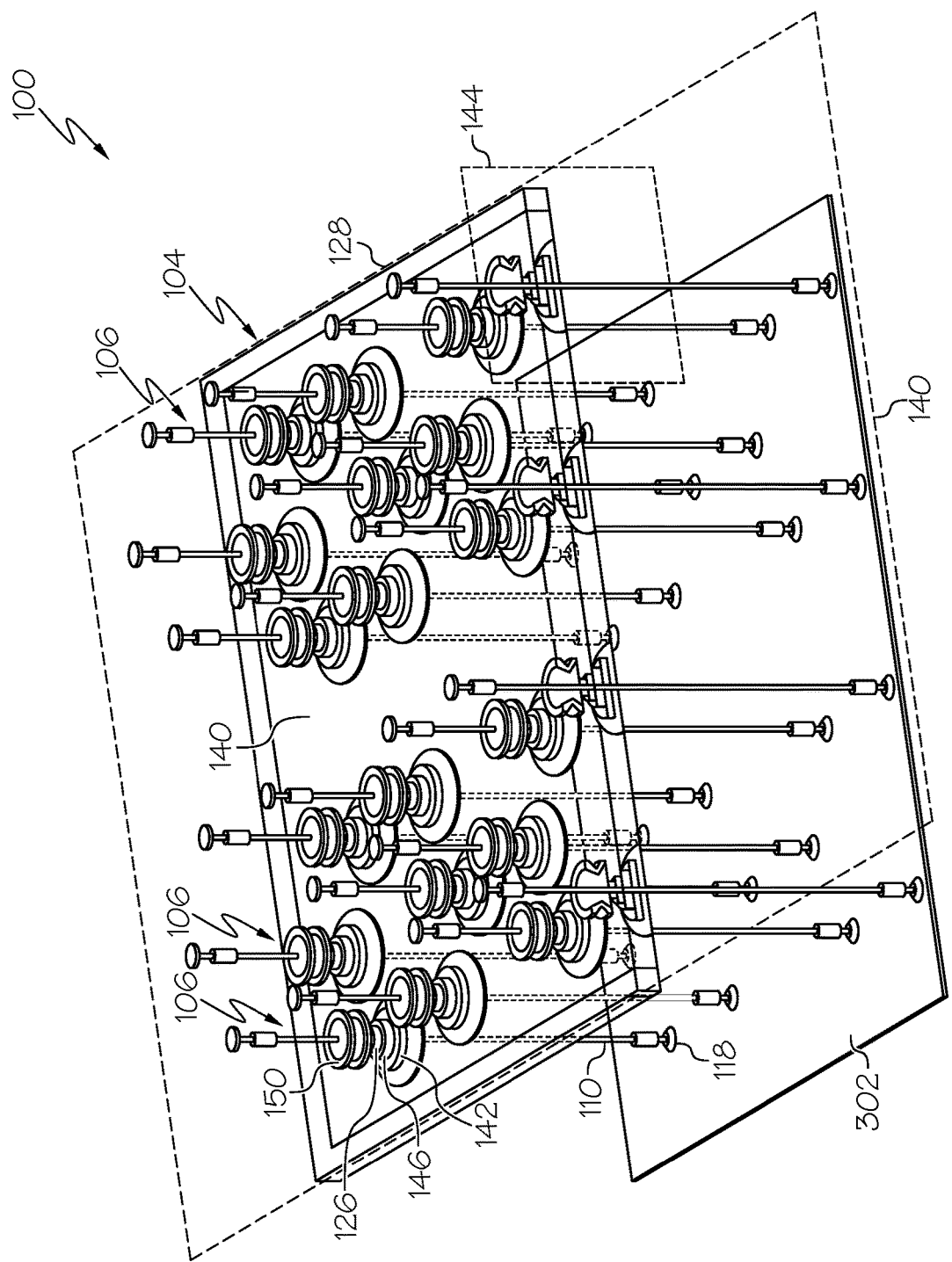
FIG. 6 is a schematic, perspective view of an example of a portion of the apparatus for applying composite layups.

FIGS. 5 and 6 schematically illustrate examples of the apparatus 100. In one or more examples, the support platform 104 includes a frame 128 and a plate assembly 140. The plate assembly 140 is coupled to the frame 128. The housing 126 of the passive actuator 106 (e.g., of each one of the plurality of passive actuators 106) is coupled to the plate assembly 140.

In one or more examples, the plate assembly 140 includes a plurality of plate openings 142. At least a portion of the housing 126 of the passive actuator 106 (e.g., of each one of the plurality of passive actuators 106) is situated in the plate opening 142 (e.g., a corresponding one of the plurality of plate openings 142). Throughout the present disclosure, singular reference to the plate opening 142 may refer to any one of or each one of the plurality of plate openings 142.

Referring to FIG. 6, in one or more examples, the housing 126 of the passive actuator 106 (e.g., of at least one of the plurality of passive actuators 106) is linearly movable in the plate opening 142 (e.g., a corresponding one of the plurality of plate openings 142). For example, the housing 126 of the passive actuator 106 is linearly movable, within the plate opening 142, relative to the plate assembly 140 in at least one direction that is parallel to a plane 144 (e.g., as shown in FIG. 6) that extends through the plurality of plate openings 142. Linear movement of the housing 126 in at least one direction that is parallel to the plane 144 enables selective positioning of each one or any one of the plurality of passive actuators 106 along the rail 130, for example, in directions along the X-axis and/or the Y-axis. Linear movement of the passive actuator 106 enables the passive actuator 106 to be properly located at a desired or predetermined location relative to the composite sheet 302 and/or relative to the layup surface 210.

Referring still to FIG. 6, in one or more examples, the housing 126 of the passive actuator 106 (e.g., of at least one of the plurality of passive actuators 106) is rotationally movable within the plate opening 142 (e.g., a corresponding one of the plurality of plate openings 142). For example, the housing 126 of the passive actuator 106 is rotationally movable, within the plate opening 142, relative to the plate assembly 140 in at least one plane of rotation 148. In one or more examples, the plane of rotation 148 is perpendicular to the plane 144. Rotational movement of the housing 126 in the plane of rotation 148 enables selective orienting of each one or any one of the plurality of passive actuators 106 relative to the rail 130, for example, about the X-axis and/or the Y-axis. Rotational movement of the passive actuator 106 enables the passive actuator 106 to be properly oriented at a desired angular orientation relative to the composite sheet 302 and/or relative to the layup surface 210.

Referring still to FIG. 6, in one or more examples, the passive actuator 106 (e.g., at least the one of the plurality of passive actuators 106) includes a locking mechanism 146. The locking mechanism 146 is configured to fix the housing 126 of the passive actuator 106 in the plate opening 142 and relative to the plate assembly 140. In one or more examples, the locking mechanism 146 inhibits linear movement of the housing 126, within the plate opening 142, relative to the plate assembly 140. In one or more examples, the locking mechanism 146, additionally or alternatively, inhibits rotational movement of the housing 126, within the plate opening 142, relative to the plate assembly 140. In one or more examples, the locking mechanism 146 is situated within the plate opening 142 between the housing 126 and the plate assembly 140.

Referring still to FIG. 6, in one or more examples, the housing 126 of the passive actuator 106 (e.g., of at least one of the plurality of passive actuators 106) includes a positioning mechanism 150. The positioning mechanism 150 is configured to center the housing 126 in the plate opening 142, for example, after linear and/or rotational movement of the housing 126 relative to the plate assembly 140.

FIGS. 7-12 schematically illustrate examples of the system 200 at different stages of an automated pick and place operation for applying and shaping the composite sheet 302 against the layup surface 210 using the apparatus 100. FIGS. 7-10 illustrate a portion of the apparatus 100 and, more particularly, four of the passive actuators 106. It can be appreciated that the apparatus 100 may include any number of passive actuators 106 depending, for example, on the size (e.g., area) of the composite sheet 302, the geometry of the layup surface 210, and/or a degree of the contour of the layup surface 210.

In one or more examples, the system 200 includes the tool 202. The tool 202 includes the tool surface 204. The tool 202 is an example of a layup tool or lamination tool that is used to shape and form the composite layup 300. In one or more examples, the tool surface 204 includes at least one contour or otherwise has a complex (e.g., non-planar) geometry. Generally, the shape or contour of the tool surface 204 of the tool 202 substantially matches the desired shape or contour of the final composite laminate.

In one or more examples, the layup surface 210 is the tool surface 204 of the tool 202, for example, when placing and shaping an initial one of the plurality of composite sheets 302 that form the composite layup 300. In one or more examples, the layup surface 210 is an exterior or exposes surface of a previously placed and shaped composite sheet 302, for example, when placing and shaping a subsequent one the plurality of composite sheets 302 that form the composite layup 300.

In one or more examples, the tool surface 204 includes at least a first tool-surface portion 206 and a second tool-surface portion 208 (e.g., as shown in FIGS. 3 and 5). The second tool-surface portion 208 is noncoplanar with the first tool-surface portion 206. As such, in one or more examples, the layup surface 210 includes at least a first layup-surface portion 212 (e.g., having a shape formed by the first tool-surface portion 206) and a second layup-surface portion 214 (e.g., having a shape formed by the second tool-surface portion 208). The second layup-surface portion 214 is noncoplanar with the first layup-surface portion 212 (e.g., as shown in FIGS. 7-12).

It can be appreciated that the tool surface 204 and, thus, the layup surface 210 may have any number of portions that are noncoplanar with at least another portion of the tool surface 204 and, thus, the layup surface 210 based on the geometry and/or contour of the tool surface 204. In FIGS. 7-10, for the purpose of illustration, the first layup-surface portion 212 of the layup surface 210 includes a convex portion of the of the layup surface 210 having a crest or maximum height and the second layup-surface portion 214 of the layup surface 210 includes a concave portion of the layup surface 210 having a valley or minimum height.

The system 200 includes the support platform 104. In one or more examples, the support platform 104 is positionable (e.g., movable and selectively located) relative to the layup surface 210 (e.g., the tool surface 204). In one or more examples, the support platform 104 includes the frame 128 and at least one rail 130 (e.g., as shown in FIGS. 3 and 4). In one or more examples, the support platform 104 includes the frame 128 and the plate assembly 140 (e.g., as shown in FIGS. 5 and 6).

In one or more examples, the system 200 includes a movable platform 216 (e.g., as shown in FIGS. 3 and 4). The movable platform 216 is coupled to the support platform 104. The movable platform 216 is configured to move the support platform 104 relative to the tool 202, for example, relative to the tool surface 204. In one or more examples, the movable platform 216 includes or takes the form of an overhead gantry (e.g., as shown in FIGS. 3 and 4). In one or more examples, the movable platform 216 includes or takes the form of a multi-degree-of-freedom (multi-DOF) robotic arm or other automated system (not explicitly shown).

The system 200 includes the plurality of passive actuators 106. The plurality of passive actuators 106 is coupled to the support platform 104. Each one of the plurality of passive actuators 106 includes the shaft 110. In one or more examples, each one of the plurality of passive actuators 106 includes the gripper 118 that is coupled to the second shaft end 116. In one or more examples, each one of the plurality of passive actuators 106 includes the collar 108. In one or more examples, each one of the plurality of passive actuators 106 includes the housing 126.

The shaft 110 is freely movable relative to the support platform 104 in the first direction 122 along the axis of linear shaft movement 120 and, thus, the passive actuator 106 freely retracts in response to engagement of the gripper 118 with the layup surface 210 (e.g., the tool surface 204) when placing and shaping the composite sheet 302 against the layup surface 210. Movement of the shaft 110 relative to the support platform 104 in the second direction 124 along the axis of linear shaft movement 120 and, thus, extension of the passive actuator 106 is automatically inhibited. Movement of the shaft 110 in the second direction 124 and, thus, extension of the passive actuator 106 is selectively enabled.

In one or more examples, the support platform 104 is movable relative to the tool 202 to engage the gripper 118 of at least one of the plurality of passive actuators 106 with the layup surface 210 (e.g., the tool surface 204). As an example, the movable platform 216 moves the support platform 104, the plurality of passive actuators 106, and the composite sheet 302 held by the plurality of passive actuators 106 toward the layup surface 210.

In one or more examples, the tool 202 is movable relative to the support platform 104 to engage the gripper 118 of at least one of the plurality of passive actuators 106 with the layup surface 210 (e.g., the tool surface 204). As an example, the system 200 may include a movable tool-support platform (not explicitly shown) that is configured to move the tool 202 toward the composite sheet 302 held by the plurality of passive actuators 106.

Figure 7:
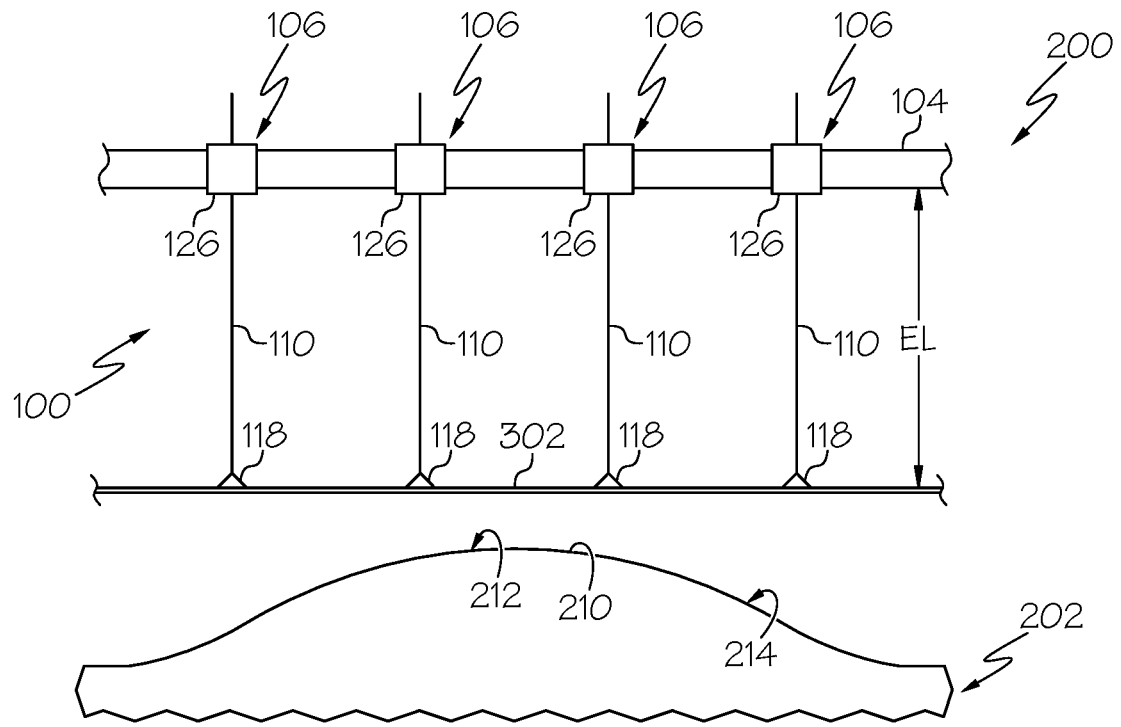
FIG. 7 is a schematic illustration of an example of a system for applying composite layups.

As illustrated in FIG. 7, in one or more examples, the apparatus 100 is used to grip, hold, and move (e.g., pick) the composite sheet 302. As an example, the support platform 104 is positioned relative to the composite sheet 302 such that the gripper 118 of each one of the plurality of passive actuators 106 is in contact with a surface of the composite sheet 302. The gripper 118 of each one of the plurality of passive actuators 106 is activated or energized to grip (e.g., adhere to via electroadhesion or vacuum) the composite sheet 302. Prior to placing the composite sheet 302 on the layup surface 210, each one of the passive actuators 106 begins in the extended (e.g., fully extended) position, for examples, having an extended (e.g., fully extended) length EL. With the plurality of passive actuators 106 in the extended position (e.g., having the extended length EL), the plurality of passive actuators 106 hold the composite sheet 302 over the layup surface 210.

Figure 8:
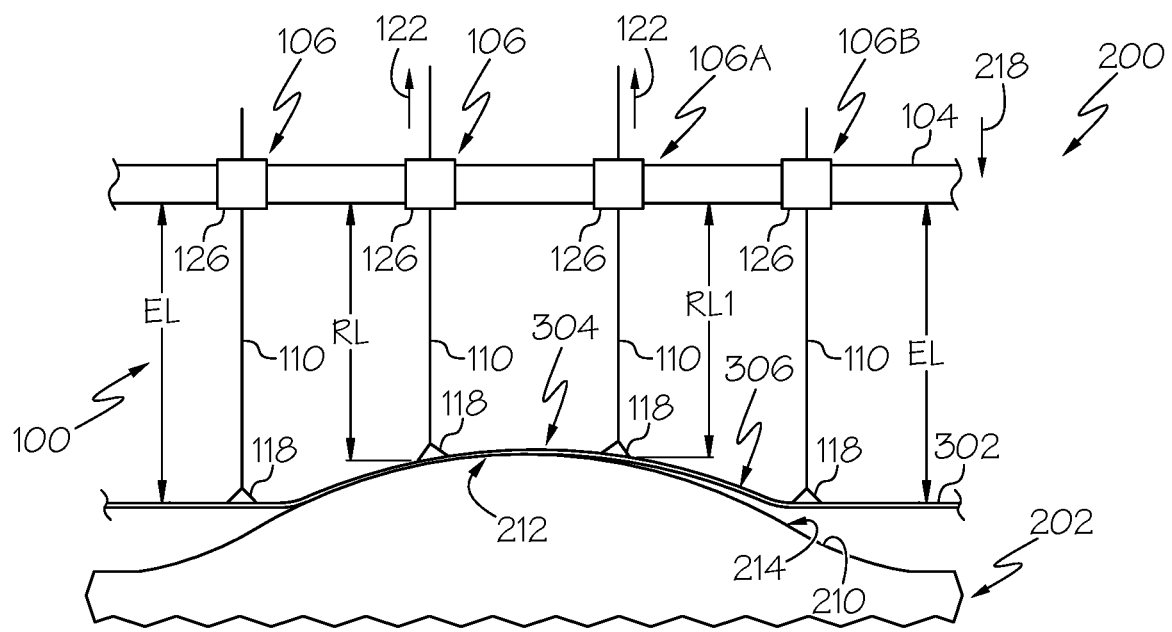
FIG. 8 is a schematic illustration of an example of the system for applying composite layups shown in FIG. 7.
Figure 9:
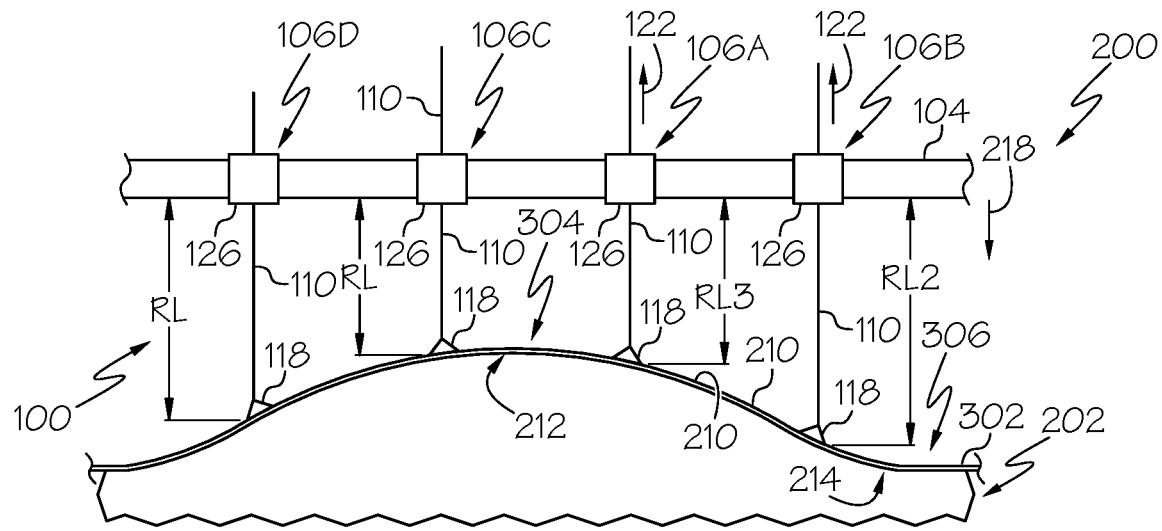
FIG. 9 is a schematic illustration of an example of the system for applying composite layups shown in FIG. 7.
Figure 10:
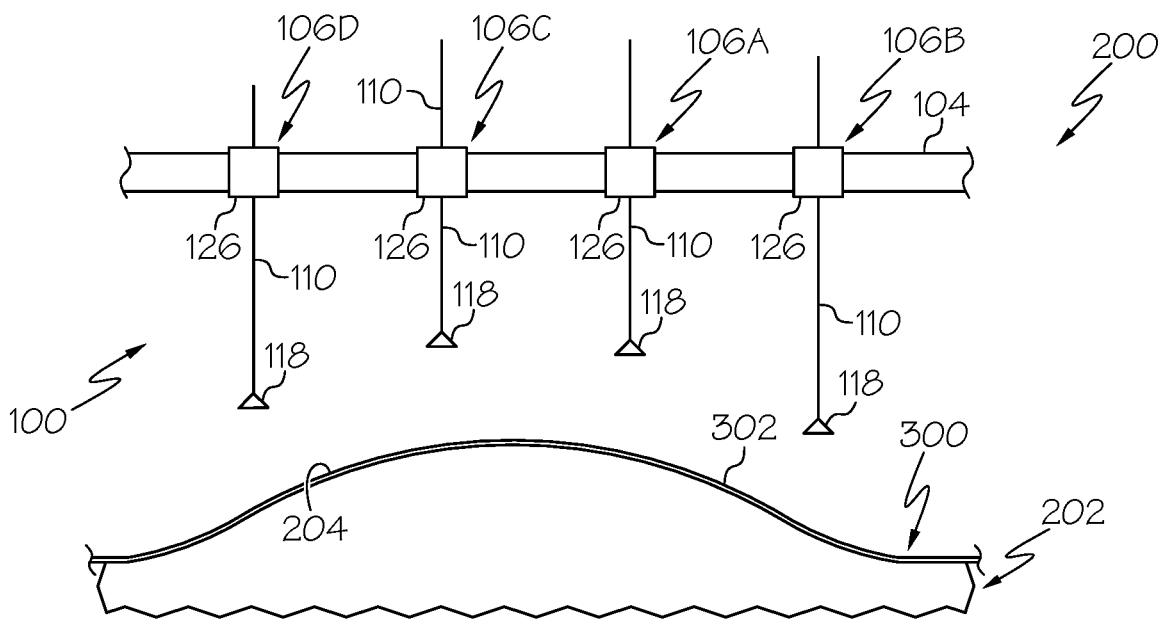
FIG. 10 is a schematic illustration of an example of the system for applying composite layups shown in FIG. 7.

As illustrated in FIGS. 8-10, the apparatus 100 is then used to drape and shape (e.g., place) the composite sheet 302 over the layup surface 210. Generally, the apparatus 100 (e.g., the support platform 104, the plurality of passive actuators 106, and the composite sheet 302) and the layup surface 210 are moved toward each other to place the composite sheet 302 against the layup surface 210 and shape the composite sheet 302 over the layup surface 210 using the plurality of passive actuators 106. The composite sheet 302 is placed and shaped against the layup surface 210 in response to passive retraction of the plurality of passive actuators 106 from the extended length EL to a corresponding retracted length RL (e.g., as shown in FIGS. 8 and 9).

As illustrated in FIGS. 7-10, in one or more examples, the layup surface 210 includes a contour or other complex geometry. Accordingly, as the apparatus 100 (e.g., the support platform 104, the plurality of passive actuators 106, and the composite sheet 302) and the layup surface 210 are moved toward each other, the composite sheet 302 is progressively placed and shaped against different portions of the layup surface 210, according to the contour of the layup surface 210, in response to passive retraction of corresponding ones of the plurality of passive actuators 106 from the extended length EL to a corresponding retracted length RL (e.g., as shown in FIGS. 8 and 9).

As an example, the support platform 104 is moved, for example, by the movable platform 216, in the direction of directional arrow 218. The support platform 104 is moved toward the layup surface 210 until the gripper 118 of at least a first one of the plurality of passive actuators 106 (e.g., a first passive actuator 106A shown in FIGS. 7-10) engages the layup surface 210 to place at least a portion of the composite sheet 302 against at least a portion of the layup surface 210, for example, to place a first sheet portion 304 of the composite sheet 302 against the first layup-surface portion 212 of the layup surface 210. As the support platform 104 continues to move toward the layup surface 210, the first passive actuator 106A freely retracts in response to the layup surface 210 pushing against the first passive actuator 106A (e.g., engagement between the gripper 118 and the layup surface 210), thereby resulting in linear movement of the shaft 110 in the first direction 122 such that the first passive actuator 106A passively retracts from the extended length EL (e.g., as shown in FIG. 7) to a first retracted length RL1 (e.g., a partially retracted length as shown in FIG. 8).

Additionally, in one or more examples, biasing the first passive actuator 106A (e.g., the shaft 110) in the second direction 124 (e.g., toward extension) during retraction of the first passive actuator 106A, for example, by the spring 154 (e.g., as shown in FIGS. 1 and 2), applies a desired or predetermined force to shape the composite sheet 302 against the layup surface 210 (e.g., the first sheet portion 304 against the first layup-surface portion 212).

As illustrated in FIG. 9, the apparatus 100 and the layup surface 210 continue to move (e.g., are moved further) toward each other. As an example, the support platform 104 is further moved, for example, by the movable platform 216, in the direction of directional arrow 218. The support platform 104 is moved further toward the layup surface 210 until the gripper 118 of at least a second one of the plurality of passive actuators 106 (e.g., a second passive actuator 106B shown in FIGS. 7-10) engage the layup surface 210 to place at least another portion of the composite sheet 302 against at least another portion of the layup surface 210, for example, to place a second sheet portion 306 of the composite sheet 302 against the second layup-surface portion 214 of the layup surface 210. As the support platform 104 continues to move further toward the layup surface 210, the second passive actuator 106B freely retracts in response to the layup surface 210 pushing against the second passive actuator 106B (e.g., engagement between the gripper 118 and the layup surface 210), thereby resulting in linear movement of the shaft 110 in the first direction 122 such that the second passive actuator 106B passively retracts from the extended length EL (e.g., as shown in FIGS. 7 and 8) to a second retracted length RL2 (e.g., an at least partially retracted length as shown in FIG. 9). Additionally, while the support platform 104 moves further toward the layup surface 210, the first passive actuator 106A freely retracts in response to the layup surface 210 pushing against the first passive actuator 106A (e.g., engagement between the gripper 118 and the layup surface 210), thereby resulting in further linear movement the shaft 110 in the first direction 122 such that the first passive actuator 106A passively retracts from the first retracted length RL1 (e.g., the partially retracted length as shown in FIG. 8) to a third retracted length RL3 (e.g., a further or fully retracted length as shown in FIG. 9).

Additionally, biasing the second passive actuator 106B (e.g., the shaft 110) in the second direction 124 (e.g., toward extension) during retraction of the second passive actuator 106B, for example, by the spring 154 (e.g., as shown in FIGS. 1 and 2) applies a desired or predetermined force to shape the composite sheet 302 against the layup surface 210 (e.g., the second sheet portion 306 against the second layup-surface portion 214).

Accordingly, during placing and shaping of the composite sheet 302 against the layup surface 210, each one of the plurality of passive actuators 106 has a retracted length RL sufficient to facilitate draping and shaping the composite sheet 302 over the various contours of the layup surface 210. For example, as illustrated in FIGS. 8 and 9, a third passive actuator 106C passively retracts in response to the layup surface 210 pushing against the third passive actuator 106C, thereby resulting in linear movement of the shaft 110 in the first direction 122 such that the third passive actuator 106C passively retracts from the extended length EL (e.g., as shown in FIG. 7) to a partially retracted length (e.g., as shown in FIG. 8) and finally to a further or fully retracted length (e.g., as shown in FIG. 9). Similarly, a fourth passive actuator 106D passively retracts in response to the layup surface 210 pushing against the fourth passive actuator 106D, thereby resulting in linear movement of the shaft 110 in the first direction 122 such that the fourth passive actuator 106D passively retracts from the extended length EL (e.g., as shown in FIGS. 7 and 8) to a partially retracted length and finally to a further or fully retracted length (e.g., as shown in FIG. 9).

As such, it can be appreciated that each one of the plurality of passive actuators 106 passively retracts in response to a corresponding portion of the layup surface 210 pushing against each one of the passive actuators 106, thereby resulting in linear movement of the shaft 110 in the first direction 122 such that each one of the passive actuators 106 passively retracts from the extended length to the partially retracted length, and then from the partially retracted length to the further or fully retracted length as the composite sheet 302 is progressively placed and shaped against the contour of the layup surface 210. Additionally, it can be appreciated that, in one or more examples, any given pair of the plurality of passive actuators 106 may passively retract from the extended length to the partially retracted length, and then from the partially retracted length to the further or fully retracted length as described above with respect to the first passive actuator 106A and the second passive actuator 106B and as illustrated in FIGS. 7-10.

Further, it can be appreciated that the greater the contour of the layup surface 210, the greater the differences in the degree of retraction (e.g., differences in the retracted lengths) between different ones of the plurality passive actuators 106. For example, as illustrated in FIG. 9, the third retracted length RL3 of the first passive actuator 106A at a crest of the contour of the first layup-surface portion 212 is less than the second retracted length RL2 of the second passive actuator 106B at a valley of the contour of the second layup-surface portion 214. Upon completely placing and shaping the composite sheet 302 against the layup surface 210, the retracted length of any one of the plurality of passive actuators 106 may be different than the retracted length of at least another one of the plurality of passive actuators 106.

As illustrated in FIG. 10, after the composite sheet 302 is placed against and shaped over the layup surface 210 by the plurality of passive actuators 106 to form at least a portion of the composite layup 300, the gripper 118 of each one of the plurality of passive actuators 106 is deactivated or deenergized to release the composite sheet 302. The apparatus 100 and the layup surface 210 are moved away from each other. As an example, the support platform 104 is moved, for example, by the movable platform 216, in the direction of directional arrow 220. As the support platform 104 moves away from the layup surface 210, extension of each one of the plurality of passive actuators 106 is inhibited such that the shaft 110 does not linearly move the second direction 124.

Prior to picking and placing a subsequent one of the composite sheets 302, each one of the plurality of passive actuators 106 is returned to the extended position, for example, having the extended length EL (e.g., as shown in FIG. 7). Extension of each one of the plurality of passive actuators 106 is achieved by selectively disengaging or unlocking the collar 108 to release the shaft 110 and to enable the shaft 110 to linearly move in the second direction 124.

Figure 11:
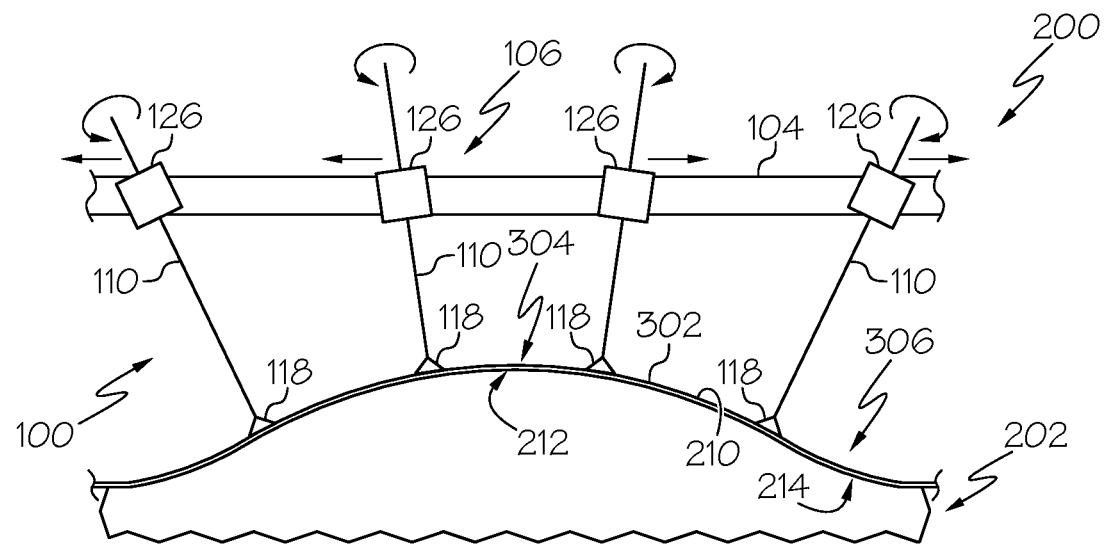
FIG. 11 is a schematic illustration of an example of the system for applying composite layups shown in FIG. 7.

Referring now to FIG. 11, in one or more examples, at least one of the plurality of passive actuators 106 is free to linearly move relative to the support platform 104 and relative to the layup surface 210 in response to engagement of the gripper 118 with the layup surface 210 (e.g., the tool surface 204). For example, the housing 126 is free to linearly move in at least one direction relative to the support platform 104 in response or reaction to a force applied to the gripper 118 by the layup surface 210 when a portion of the composite sheet 302 is placed against the layup surface 210. Free linear movement of the passive actuator 106, when placing the composite sheet 302, assists with properly locating the passive actuator 106 to match the contour of the layup surface 210.

Referring still to FIG. 11, in one or more examples, at least one of the plurality of passive actuators 106 is free to rotationally move relative to the support platform 104 and relative to the layup surface 210 in response to engagement of the gripper 118 with the layup surface 210 (e.g., the tool surface 204). For example, the housing 126 is free to rotationally move relative to the support platform 104 in response or reaction to a force applied to the gripper 118 by the layup surface 210 when a portion of the composite sheet 302 is placed against the layup surface 210. Free rotational movement of the passive actuator 106, when placing the composite sheet 302, assists with properly orienting the passive actuator 106 to match the contour of the layup surface 210 and maintain the shaft 110 in an approximately perpendicular orientation relative to the layup surface 210.

In one or more examples, each one of the plurality of passive actuators 106 is returned to an initial position prior to picking up a subsequent one of the composite sheets 302. In one or more examples, each one of the plurality of passive actuators 106 is returned to a centered position prior to picking up a subsequent one of the composite sheets 302. For example, the housing 126 is returned to a centered position within the plate opening 142 using the positioning mechanism 150 (e.g., as shown in FIG. 6).

Referring to FIG. 7, in one or more examples, composite sheet 302 is held by the plurality of passive actuators 106 in a planar (e.g., flat) configuration before the composite sheet 302 is placed against and shaped over contour of the layup surface 210. In these examples, the composite sheet 302 has a planar configuration when picked up by the apparatus 100.

Figure 12:
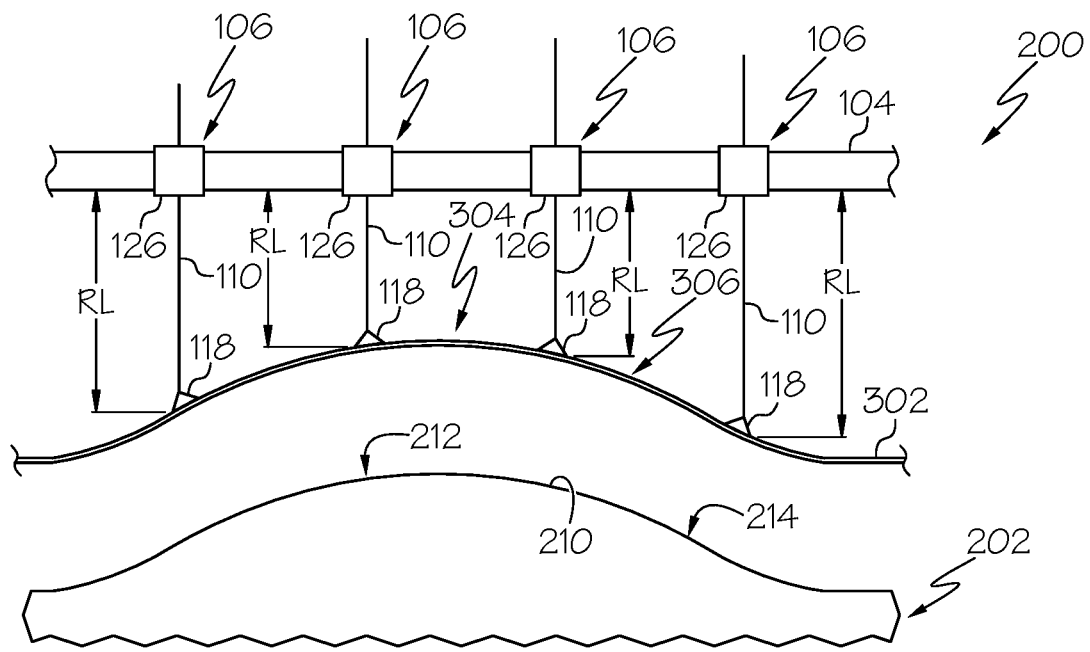
FIG. 12 is a schematic illustration of an example of the system for applying composite layups.

Referring to FIG. 12, in one or more examples, composite sheet 302 is held by the plurality of passive actuators 106 in a nonplanar (e.g., contoured) configuration before the composite sheet 302 is placed against and shaped over contour of the layup surface 210. In these examples, the composite sheet 302 has a nonplanar configuration that at least approximately matches the contour of the layup surface 210 when picked up by the apparatus 100. In these examples, each one of the plurality of passive actuators 106 is retracted to a corresponding retracted position (e.g., having a retracted length RL) suitable to matches the contour of the composite sheet 302 and/or that at least approximately match the contour of the layup surface 210 when picking up the composite sheet 302. Extension of each one of the plurality of passive actuators 106 (e.g., linear movement of the shaft 110 in the second direction 124) is inhibited such that the apparatus 100 maintains the desired contour of the composite sheet 302.

FIGS. 13-22 schematically illustrate examples of the passive actuator 106 and examples of the support platform 104. In particular, FIGS. 13-22 illustrate examples of the housing 126 of the passive actuator 106 and examples of the plate assembly 140.

Referring to FIGS. 13-20, in one or more examples, the plate assembly 140 includes a first plate 168. The first plate 168 includes a first-plate first surface 170 and a first-plate second surface 172 that is opposite (e.g., faces away from) the first-plate first surface 170. The first plate 168 includes a plurality of first plate openings 174. Each one of the first plate openings 174 extends, inclusively, between the first-plate first surface 170 and the first-plate second surface 172.

The plate assembly 140 includes a second plate 176 that is spaced away from the first plate 168. The second plate 176 includes a second-plate first surface 178 and a second-plate second surface 180 that is opposite (e.g., faces away from) the second-plate first surface 178. The second-plate first surface 178 faces the first-plate second surface 172. The second plate 176 includes a plurality of second plate openings 182. Each one of the second plate openings 182 extends, inclusively, between the second-plate first surface 178 and the second-plate second surface 180. Each one of the second plate openings 182 is aligned with a corresponding one of the first plate openings 174.

For the purpose of the present disclosure, two or more openings being aligned with each other refers to the two or more openings being situated such that a central axis of each one of the openings is parallel to or coincident with a central axis of another one of the openings.

The plate assembly 140 includes a third plate 184 that is spaced away from the second plate 176, opposite the first plate 168. The third plate 184 includes a third-plate first surface 186 and a third-plate second surface 188 that is opposite (e.g., faces away from) the second-plate first surface 178. The third-plate first surface 186 faces the second-plate second surface 180. The third plate 184 includes a plurality of third plate openings 190. Each one of the third plate openings 190 extends, inclusively, between the third-plate first surface 186 and the third-plate second surface 188. Each one of the third plate openings 190 is aligned with a corresponding one of the first plate openings 174 and a corresponding one of the second plate openings 182.

Throughout the present disclosure, singular reference to the first plate opening 174 may refer to any one of or each one of the plurality of first plate openings 174. Singular reference to the second plate opening 182 may refer to any one of or each one of the plurality of second plate openings 182. Singular reference to the third plate opening 190 may refer to any one of or each one of the plurality of third plate openings 190.

The first plate opening 174, the second plate opening 182, and the third plate opening 190 form or define the plate opening 142 of the plate assembly 140. The shaft 110 extends through the first plate opening 174, the second plate opening 182, and the third plate opening 190.

Referring to FIGS. 13-16, in one or more examples, a portion of the housing 126 is situated between the first plate 168 and the second plate 176. A portion of the housing 126 is situated within the second plate opening 182. A portion of the collar 108, for example, the collar lock 164 extends from the housing 126 and is situated within and/or is accessible through first plate opening 174 for disengaging the collar 108 from the shaft 110 to enable extension of the passive actuator 106 (e.g., linear movement of the shaft 110 in the second direction 124).

In one or more examples, the housing 126 is linearly movable within in the second plate opening 182 and between the first plate 168 and the second plate 176 in one or more directions along the plane 144 (e.g., as shown in FIG. 6). In one or more examples, the housing 126 is rotationally movable within the second plate opening 182 and between the first plate 168 and the second plate 176 in the plane of rotation 148 (e.g., as shown in FIG. 6).

In one or more examples, the passive actuator 106 includes a support flange 192. The support flange 192 is coupled to the housing 126. In one or more examples, the support flange 192 extends outward from the housing 126, for example, radially outward about the shaft axis 112. The support flange 192 is situated between the second plate 176 and the third plate 184. In one or more examples, the support flange 192 is in contact with the second-plate second surface 180 and the third-plate first surface 186. In one or more examples, the support flange 192 includes bearings that engage the second-plate second surface 180 and the third-plate first surface 186 to reduce friction during linear movement of the housing 126.

In one or more examples, the housing 126 is linearly movable relative to the support flange 192, for example, along the axis of linear shaft movement 120. Linear movement of the housing 126 relative to the support flange 192 enables recentering of the housing 126 within the second plate opening 182, for example, after movement of the housing 126.

In one or more examples, the housing 126 is biased away from support flange 192 and toward the first plate 168. For example, the passive actuator 106 includes a housing spring 194, or other biasing element, that is situated between the housing 126 and the support flange 192. The housing spring 194 biases the housing 126 away from the support flange 192 and urges the housing 126 into contact with the first-plate second surface 172. In one or more examples, the housing 126 includes bearings that engage the first-plate second surface 172 to reduce friction during linear movement of the housing 126.

Figure 13:
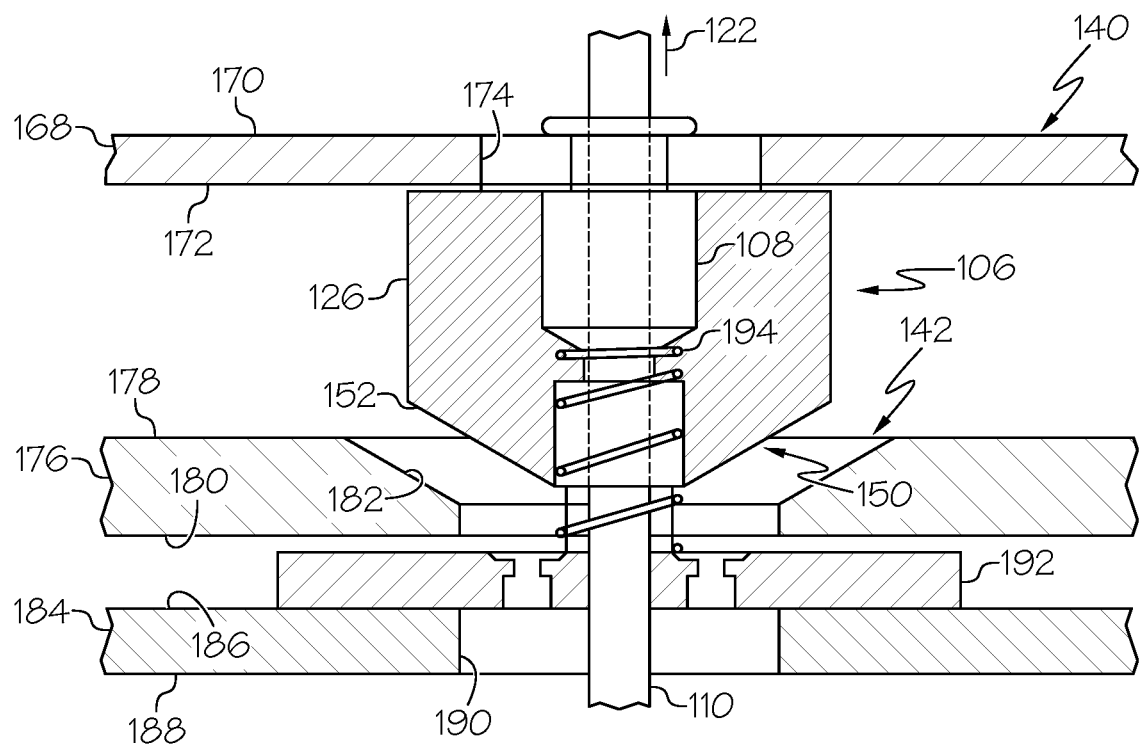
FIG. 13 is a schematic, elevation, sectional view of an example of a portion of the passive end effector.

FIG. 13 illustrates an example of the passive actuator 106 with the housing 126 in a centered position, for example, at a start of the placing operation and before engagement of the composite sheet 302 against the layup surface 210 (e.g., as shown in FIG. 7). As illustrated, the housing 126 is biased away from the support flange 192 by the housing spring 194 such that an end of the housing 126 is urged against the first-plate second surface 172. During placement of the composite sheet 302 against the layup surface 210 the shaft 110 is free to linearly move in the first direction 122 to retract the passive actuator 106.

Figure 14:
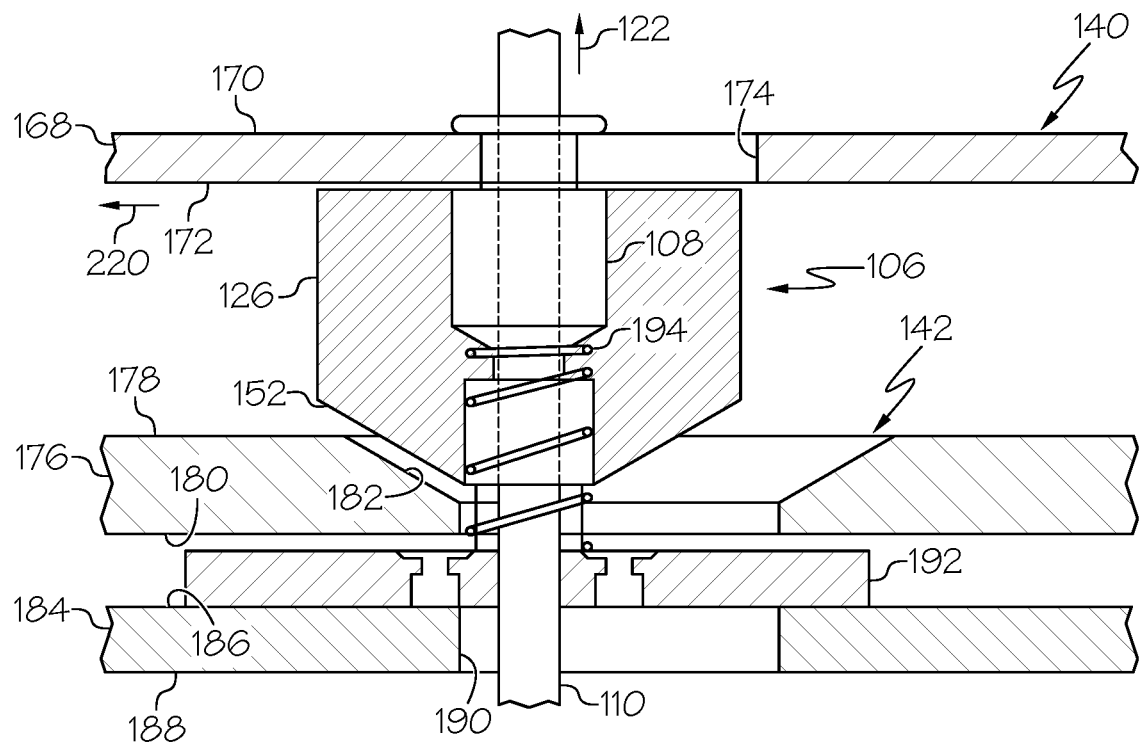
FIG. 14 is a schematic, elevation, sectional view of an example of the passive end effector shown in FIG. 13.

FIG. 14 illustrates an example of the passive actuator 106 with the housing 126 linearly moved relative to the plate assembly 140, for example, during the placing operation and upon placement of the composite sheet 302 against the layup surface 210 (e.g., as shown in FIGS. 8, 9 and 11). As illustrated, the housing 126 and, thus, the passive actuator 106 is linearly moved relative to the plate assembly 140 (e.g., in the direction of directional arrow 220). Such linear movement of the passive actuator 106 may be in response to engagement of the gripper 118 with the layup surface 210 when placing the composite sheet 302 against the layup surface 210 (e.g., as shown in FIGS. 8, 9 and 11). This linear movement of the passive actuator 106 may occur during retraction of the passive actuator 106 (e.g., while the shaft 110 linearly moves in the first direction 122).

Figure 15:
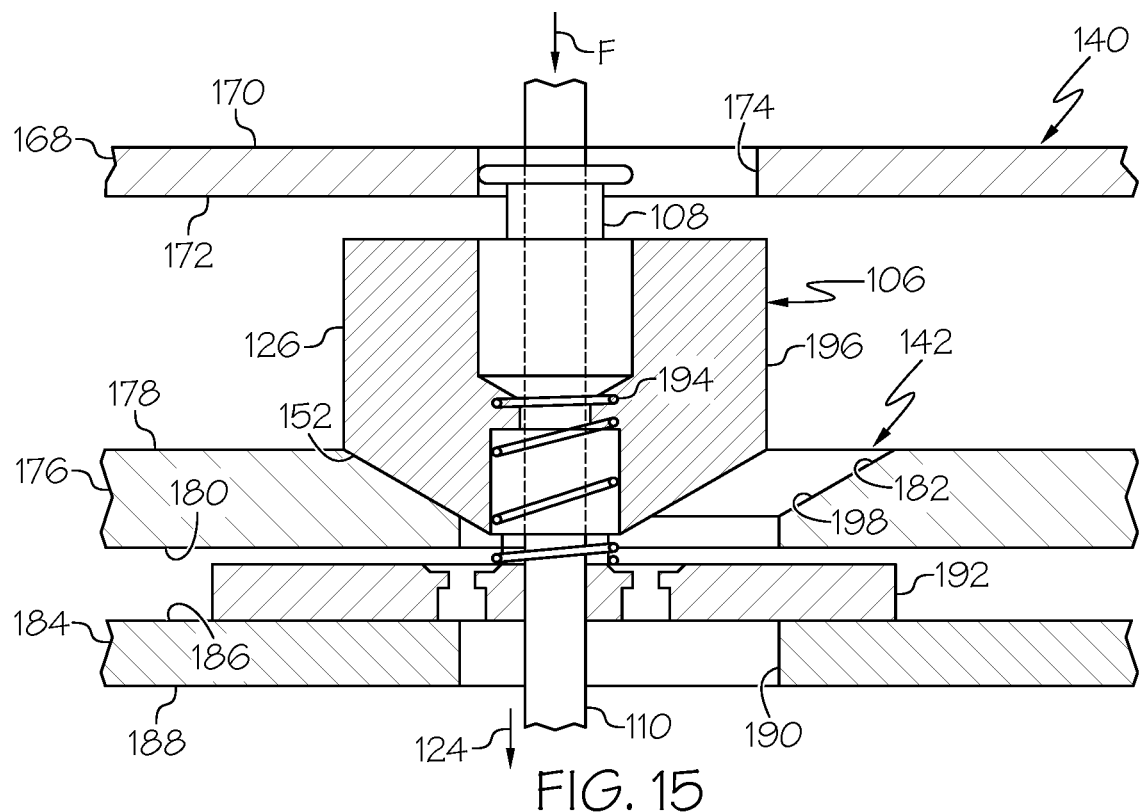
FIG. 15 is a schematic, elevation, sectional view of an example of the passive end effector shown in FIG. 13.
Figure 16:
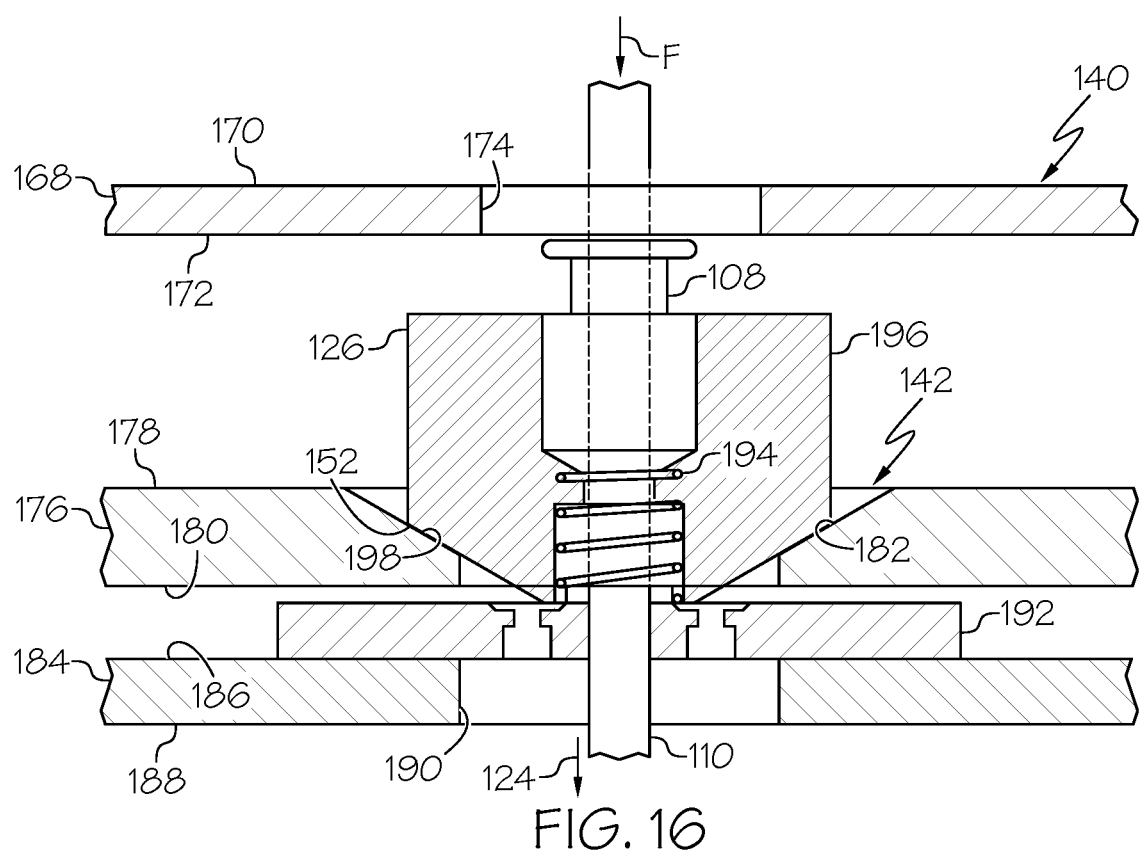
FIG. 16 is a schematic, elevation, sectional view of an example of the passive end effector shown in FIG. 13.

FIGS. 15 and 16 schematically illustrate an example of stages of a recentering operation of the housing 126 and, thus, the passive actuator 106, for example, after placement of the composite sheet 302 against the layup surface 210. The recentering operation is achieved using the positioning mechanism 150 (e.g., as shown in FIG. 6).

In one or more examples, the housing 126 includes a housing body 196 and the positioning mechanism 150 that is coupled to the housing body 196. In one or more examples, the positioning mechanism 150 includes an annular tapered surface 152 of the housing 126. The annular tapered surface 152 extends from the housing body 196. The annular tapered surface 152 of the housing 126 is situated in the plate opening 142. Engagement between the annular tapered surface 152 of the housing 126 and the plate opening 142 centers the housing 126 in the plate opening 142.

For example, the annular tapered surface 152 of the housing 126 is situated in the second plate opening 182. In one or more examples, the second plate opening 182 is a countersunk opening. In one or more examples, the second plate opening 182 includes an annular tapered plate surface 198 that has an angle that matches a taper angle of the annular tapered surface 152 of the housing 126.

The recentering operation is performed by applying a force F to the shaft 110 in the second direction 124. The collar 108 prevents the shaft 110 from linearly moving in the second direction 124 (e.g., prevents extension of the passive actuator 106). Thus, with the collar 108 engaged and locked to the shaft 110, the force F applied to the shaft 110 linearly moves the housing 126 toward the support flange 192. Linear movement of the housing 126 in the second direction 124, in response to the force F, places the annular tapered surface 152 of the housing 126 in contact with the annular tapered plate surface 198 (e.g., as shown in FIG. 15). Further linear movement of the housing 126 in the second direction 124, in response to the force F, moves the annular tapered surface 152 along the annular tapered plate surface 198 until the housing 126 is centered in the second plate opening 182 (e.g., as shown in FIG. 16).

Upon removal of the force F from the shaft 110, the housing 126 is urged away from the support flange 192 and back into contact with the first-plate second surface 172 (e.g., as shown in FIG. 13). At this point, the collar 108 may be disengaged to unlock the shaft 110 and enable the shaft 110 to linear move in the second direction 124 to place the passive actuator 106 back in the extended position.

Referring to FIGS. 17-20, in one or more examples, a portion of the housing 126 is situated between the first plate 168 and the second plate 176. A portion of the housing 126 is situated within the second plate opening 182. A portion of the housing 126 is situated within the third plate opening 190. A portion of the collar 108, for example, the collar lock 164 extends from the housing 126 and is situated within and/or is accessible through first plate opening 174 for disengaging the collar 108 from the shaft 110 to enable extension of the passive actuator 106 (e.g., linear movement of the shaft 110 in the second direction 124).

In one or more examples, the housing 126 is linearly movable within in the first plate opening 174, the second plate opening 182, and the third plate opening 190 in one or more directions along the plane 144 (e.g., as shown in FIG. 6). In one or more examples, the housing 126 is rotationally movable within the first plate opening 174, the second plate opening 182, and the third plate opening 190 in the plane of rotation 148 (e.g., as shown in FIG. 6).

In one or more examples, the passive actuator 106 includes the support flange 192. The support flange 192 is coupled to the housing 126. In one or more examples, the support flange 192 extends outward from the housing 126, for example, radially outward about the shaft axis 112. The support flange 192 is situated between the second plate 176 and the third plate 184. In one or more examples, the support flange 192 is in contact with the second-plate second surface 180 and the third-plate first surface 186. In one or more examples, the support flange 192 includes bearings that engage the second-plate second surface 180 and the third-plate first surface 186 to reduce friction during linear movement of the housing 126.

Figure 17:
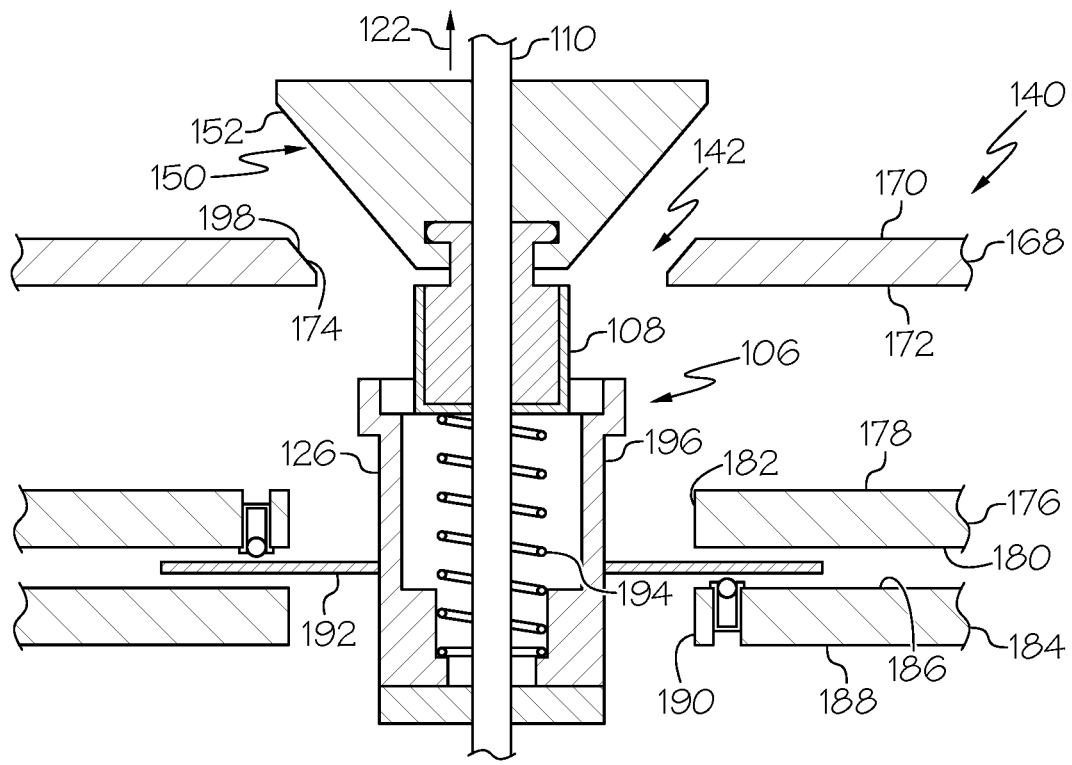
FIG. 17 is a schematic, elevation, sectional view of an example of a portion of the passive end effector.

FIG. 17 illustrates an example of the passive actuator 106 with the housing 126 in a centered position, for example, at a start of the placing operation and before engagement of the composite sheet 302 against the layup surface 210 (e.g., as shown in FIG. 7). During placement of the composite sheet 302 against the layup surface 210 the shaft 110 is free to linearly move in the first direction 122 to retract the passive actuator 106.

Figure 18:
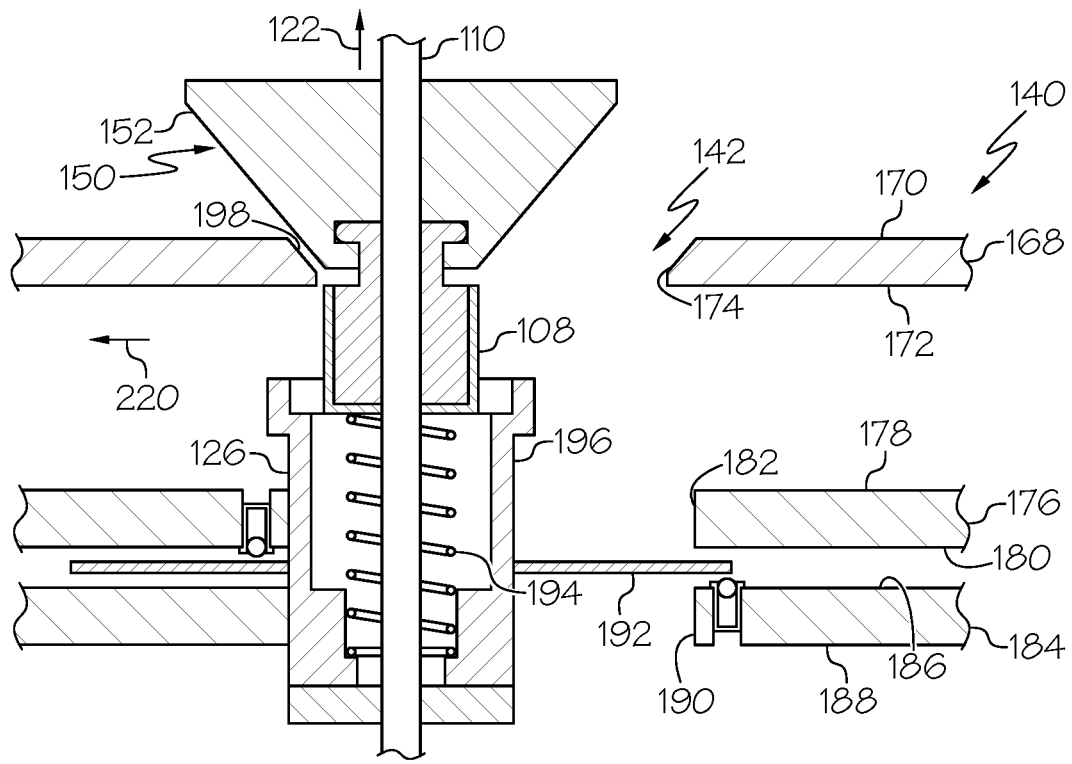
FIG. 18 is a schematic, elevation, sectional view of an example of the passive end effector shown in FIG. 17.

FIG. 18 illustrates an example of the passive actuator 106 with the housing 126 linearly moved relative to the plate assembly 140, for example, during the placing operation and upon placement of the composite sheet 302 against the layup surface 210 (e.g., as shown in FIGS. 8, 9 and 11). As illustrated, the housing 126 and, thus, the passive actuator 106 is linearly moved relative to the plate assembly 140 (e.g., in the direction of directional arrow 220). Such linear movement of the passive actuator 106 may be in response to engagement of the gripper 118 with the layup surface 210 when placing the composite sheet 302 against the layup surface 210 (e.g., as shown in FIGS. 8, 9 and 11). This linear movement of the passive actuator 106 may occur during retraction of the passive actuator 106 (e.g., while the shaft 110 linearly moves in the first direction 122).

FIGS. 15 and 16 schematically illustrate an example of stages of a recentering operation of the housing 126 and, thus, the passive actuator 106, for example, after placement of the composite sheet 302 against the layup surface 210. The recentering operation is achieved using the positioning mechanism 150 (e.g., as shown in FIG. 6).

In one or more examples, the housing 126 includes the housing body 196 and the positioning mechanism 150. A portion of the collar 108 (e.g., the collar body 162) is situated within the housing body 196 and a portion of the collar 108 (e.g., the collar lock 164) extends from the housing body 196. The positioning mechanism 150 is coupled to the collar lock 164. In one or more examples, the positioning mechanism 150 includes the annular tapered surface 152 of the housing 126. The annular tapered surface 152 extends from collar lock 164. The annular tapered surface 152 is situated in the plate opening 142. Engagement between the annular tapered surface 152 and the plate opening 142 centers the housing 126 in the plate opening 142.

In one or more examples, the collar 108 and the positioning mechanism 150 (e.g., the annular tapered surface 152) are linearly movable relative to the housing body 196, for example, along the axis of linear shaft movement 120. Linear movement of the collar 108 and the positioning mechanism 150 relative to the housing body 196 enables recentering of the housing 126 within the plate opening 142 (e.g., within the first plate opening 174, the second plate opening 182, and the third plate opening 190), for example, after movement of the housing 126.

For example, the annular tapered surface 152 is situated in the first plate opening 174. In one or more examples, the first plate opening 174 is a countersunk opening. In one or more examples, the first plate opening 174 includes the annular tapered plate surface 198 that has an angle that matches a taper angle of the annular tapered surface 152.

In one or more examples, the collar 108 and the positioning mechanism 150 are biased away from housing body 196 and through the first plate opening 174. For example, the passive actuator 106 includes the housing spring 194, or other biasing element, that is situated between the collar 108 and the housing body 196. The housing spring 194 biases the collar 108 and the positioning mechanism 150 away from the housing body 196 and urges the positioning mechanism 150 through the first plate opening 174.

Figure 19:
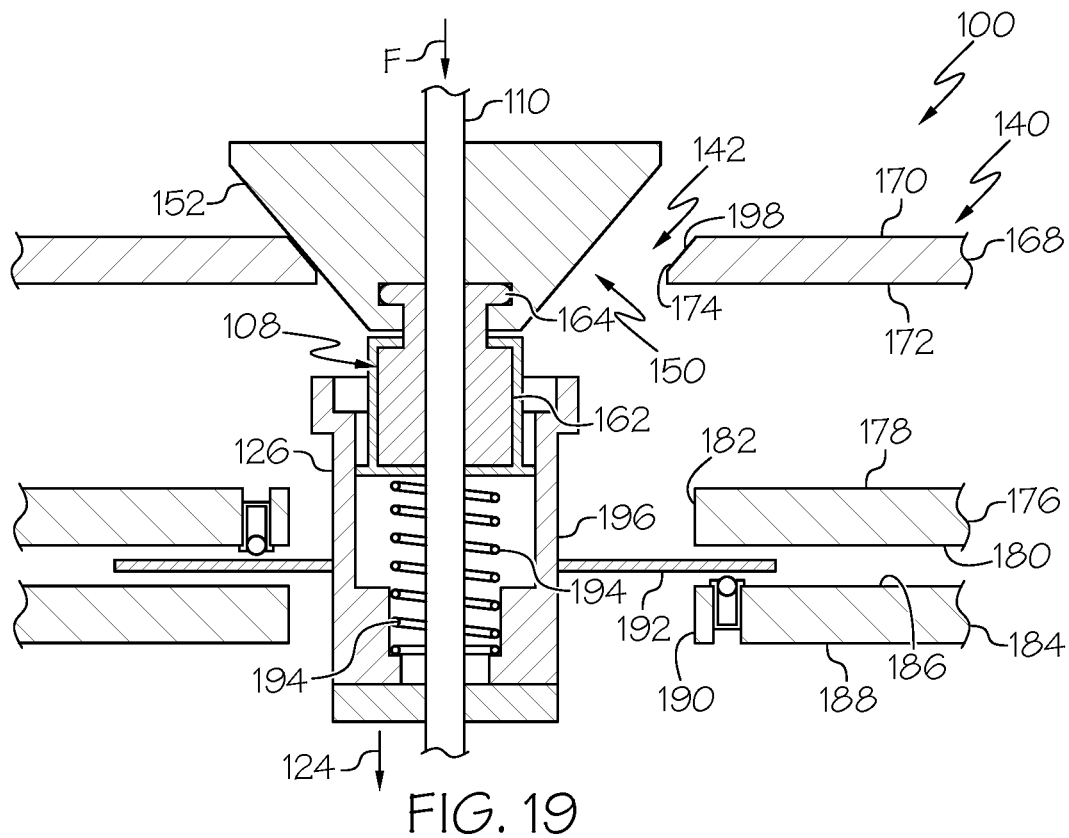
FIG. 19 is a schematic, elevation, sectional view of an example of the passive end effector shown in FIG. 17.
Figure 20:
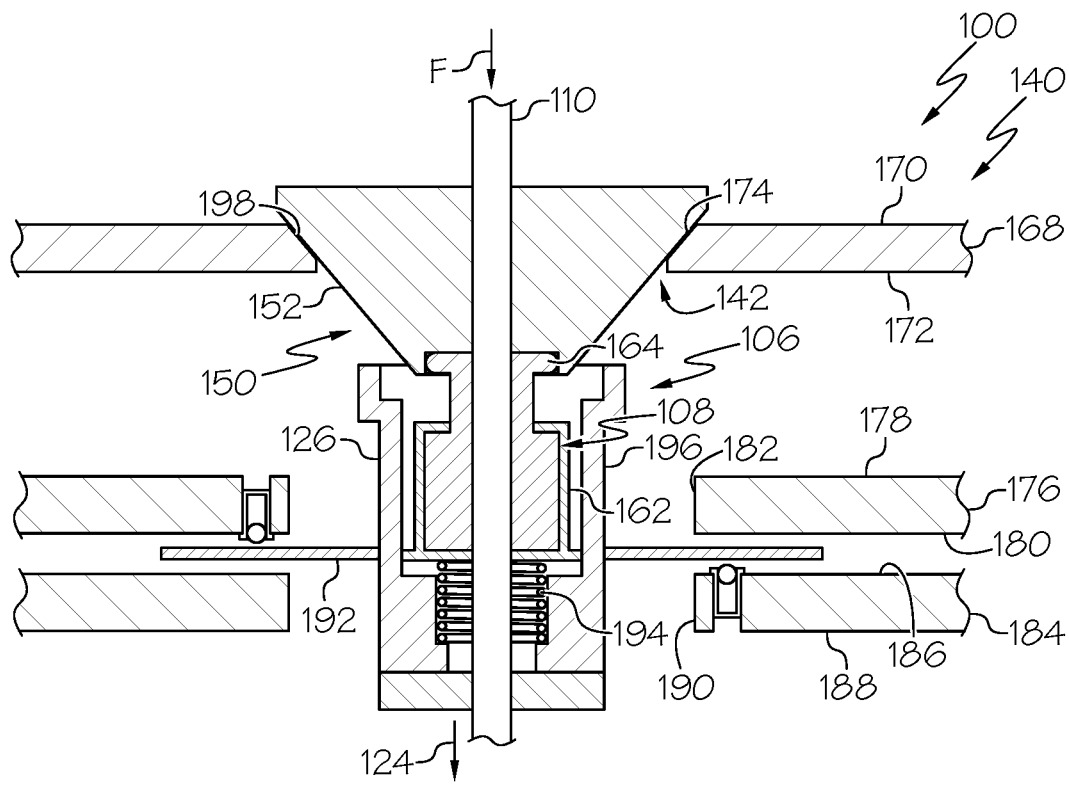
FIG. 20 is a schematic, elevation, sectional view of an example of the passive end effector shown in FIG. 17.

The recentering operation is performed by applying a force F to the shaft 110 in the second direction 124. The collar 108 prevents the shaft 110 from linearly moving in the second direction 124 (e.g., prevents extension of the passive actuator 106). Thus, with the collar 108 engaged and locked to the shaft 110, the force F applied to the shaft 110 linearly moves the collar 108 and the positioning mechanism 150 in the second direction 124 toward the housing body 196. Linear movement of the collar 108 and the positioning mechanism 150 in the second direction 124, in response to the force F, places the annular tapered surface 152 of the positioning mechanism 150 in contact with the annular tapered plate surface 198 (e.g., as shown in FIG. 19). Further linear movement of the collar 108 and the positioning mechanism 150 in the second direction 124, in response to the force F, moves the annular tapered surface 152 along the annular tapered plate surface 198 until the housing 126 is centered in the first plate opening 174 and, thus, also centered in the second plate opening 182 and the third plate opening 190 (e.g., as shown in FIG. 20).

In one or more examples, linear movement of the collar body 162 in the second direction 124 relative to the positioning mechanism 150 and the collar lock 164, in response to the force F, unlocks the collar 108 to enable linear movement of the shaft 110 in the second direction 124. For example, the annular tapered surface 152 of the positioning mechanism 150 has a maximum dimension (e.g., diameter) that is greater than a minimum dimension (e.g., diameter) of the first plate opening 174. As such, engagement of an entirety of the annular tapered surface 152 of the positioning mechanism 150 with the annular tapered plate surface 198 (e.g., as shown in FIG. 20) provides a limit or stop to linear movement of the positioning mechanism 150 and, thus, the collar lock 164 coupled to the positioning mechanism 150 in the second direction 124. Further linear movement of the collar body 162 in the second direction 124 relative to the collar lock 164, in response to the force F, moves the collar lock 164 to the unlocked position to release the shaft 110 from the collar 108, thereby enabling linear movement of the shaft 110 in the second direction 124 to place the passive actuator 106 back in the extended position. Upon removal of the force F from the shaft 110, the collar 108 and the positioning mechanism 150 are urged away from the housing body 196 (e.g., as shown in FIG. 17) such that the collar 108 is configured to reengage the shaft 110.

Figure 21:
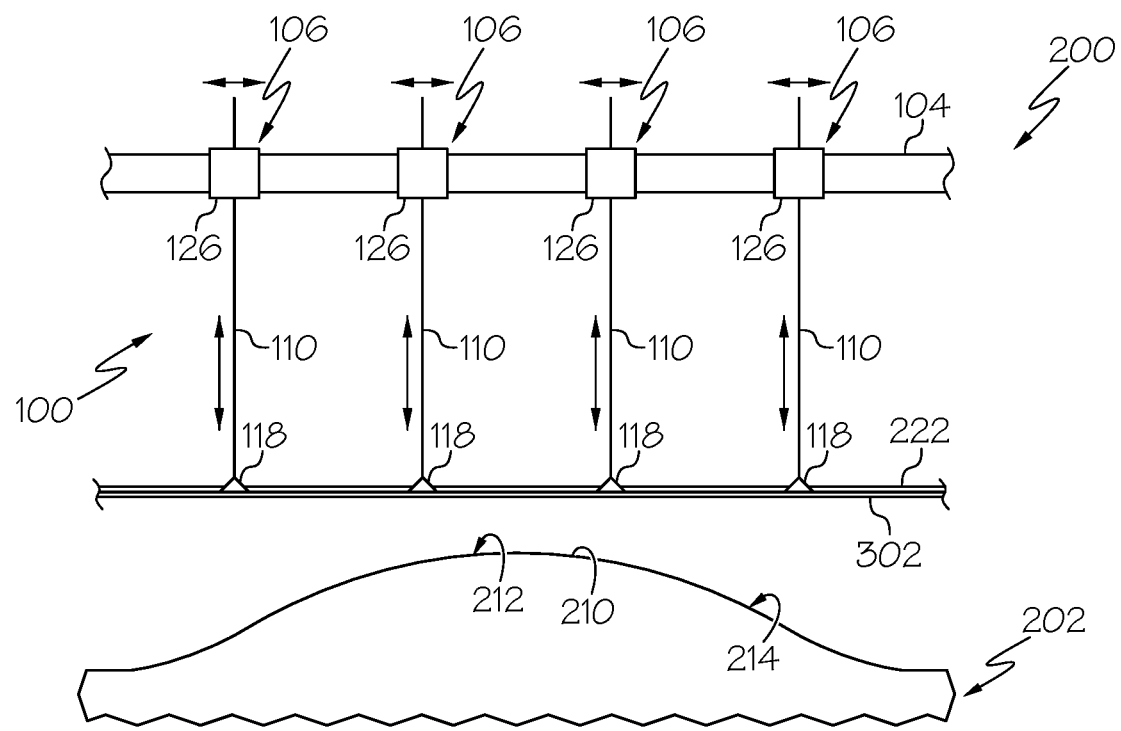
FIG. 21 is a schematic illustration of an example of the system for applying composite layups.

Referring now to FIG. 21, in one or more examples, the apparatus 100 includes a support membrane 222. The support membrane 222 is located at the second shaft end 116 of each one of the plurality of passive actuators 106. The support member 222 extends between and joins (e.g., connects) the plurality of passive actuators 106, such as each adjacent pair of the plurality of passive actuators 106, together. As an example, the support membrane 222 is coupled to the second shaft end 116 of the shaft 110. As an example, the support membrane 222 may be coupled to the second shaft end 116 between the movable joint 226 (e.g., as shown in FIG. 1) and the gripper 118 of each one of the plurality of passive actuators 106.

In one or more examples, the support membrane 222 is made of any flexible material that is suitable for use (e.g., contact) with the composite sheet 302. As an example, the support membrane 222 is made of a silicone material. As another example, the support membrane 222 is made of a bi-planar mesh material.

The support membrane 222 provides additional stiffness to the plurality of passive end effectors 106. For example, loads or forces applied to the plurality of passive end effectors 106 during the pick and place operation (e.g., as shown in FIGS. 7-12) may be distributed along the support membrane 222. The support membrane 222 may provide support (e.g., additional stiffness) during linear movement of one or more of the plurality of passive actuators 106 (e.g. the housing 126) relative to the support platform 104 (e.g., as shown by directional arrows in FIG. 21). The support membrane 222 may also provide support during retraction and extension of the one or more of the plurality of passive actuators 106, such as during linear movement of the shaft 110 (e.g., as shown by the directional arrows in FIG. 21).

Figure 22:
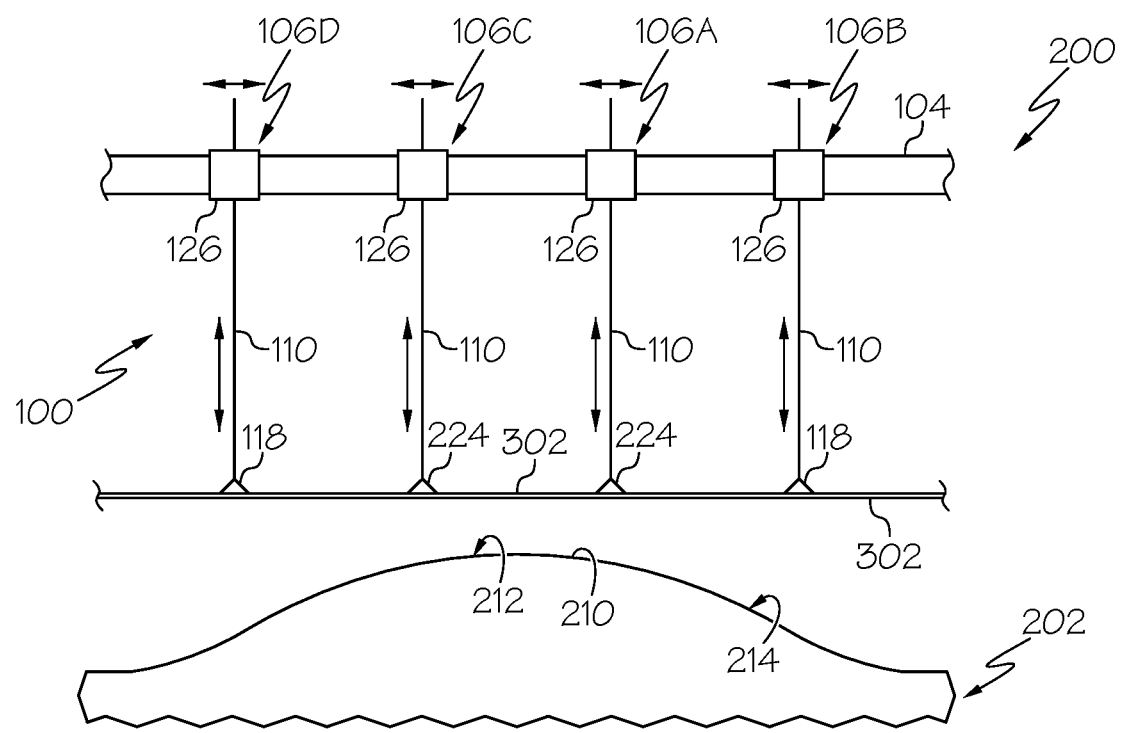
FIG. 22 is a schematic illustration of an example of the system for applying composite layups.

Referring now to FIG. 22, in one or more examples, one or more of the passive actuators 106 includes a press 224, rather than a gripper 118. The press 224 is coupled to the shaft 110 at the second shaft end 116. In one or more examples, the press 224 is rotatable or pivotable relative to second shaft end 116, like the gripper 118. As an example, the press 224 is coupled to the movable joint 226 (e.g., as shown in FIG. 1). The press 224 includes or takes the form of any one or various suitable press devices capable of exerting pressure on the composite sheet 302 when the composite sheet 302 is placed against the layup surface 210.

The press 224 does not attach to or is not otherwise secured to the surface of the composite sheet 302. For example, the press 224 does not provide any adhesion between the press 224 and the composite sheet 302. The press 224 provides or serves as a positive compacting indenter that assists the composite sheet 302 to conform to the contour or other geometry of the layup surface 210.

As illustrated in FIG. 22, in one or more examples, first ones of the plurality of passive actuators 106 (e.g., the second passive actuator 106B and the fourth passive actuator 106D) include the gripper 118 located at the second shaft end 116 of the shaft 110. Second ones of the plurality of passive actuators 106 (e.g., the first passive actuator 106A and the third passive actuator 106C) include the press 224 located at the second shaft end 116 of the shaft 110. The first ones of the plurality of passive actuators 106 (e.g., having the gripper 118) hold the composite sheet 302 during the pick and place operation. During placement of the composite sheet 302 against the layup surface 302 (e.g., as described above and illustrated in FIGS. 7-11) the second ones of the plurality of passive actuators 106 (e.g., having the press 224) press portions of the composite sheet 302 against the layup surface 21, without being attached to the composite sheet 302, during retraction of the second ones of the plurality of passive actuators 106.

Use of certain ones of the plurality of passive actuators 106 having the press 224, rather than the gripper 118, may be particularly advantageous in examples of the apparatus 100 that also utilizes the support membrane 222 (e.g., as shown in FIG. 21) as a shape retaining member.

Figure 23:
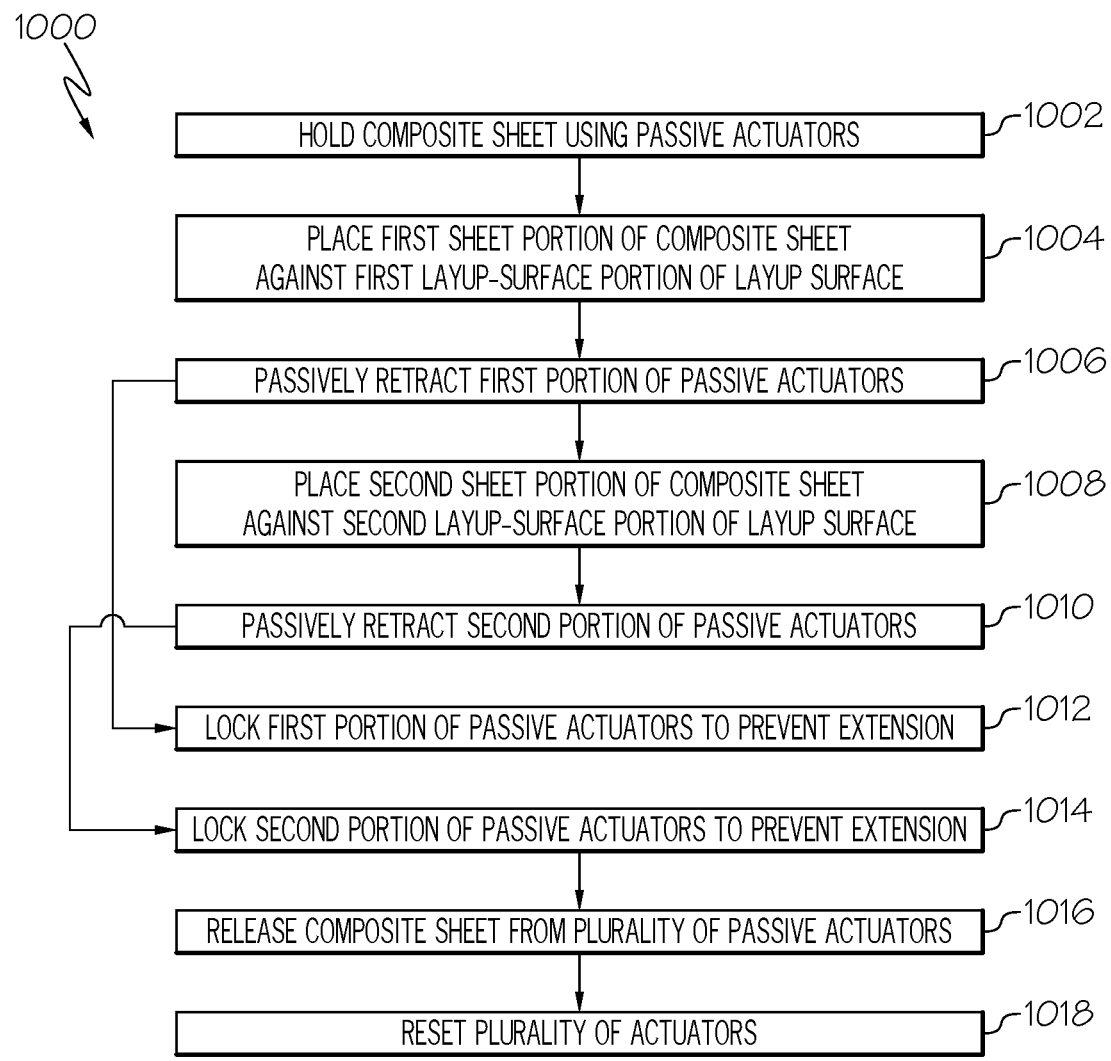
FIG. 23 is a flow diagram of an example of a method for applying a composite layup.

Referring generally to FIGS. 1-22 and particularly to FIG. 23, the present disclosure is also directed to examples of a method 1000 for applying the composite layup 300. In one or more examples, the method 1000 is implemented using the apparatus 100. In one or more examples, the method 1000 is implemented using the system 200.

Referring to FIG. 23, in one or more examples, the method 1000 includes a step of (block 1002) holding the composite sheet 302 over the layup surface 210 using the plurality of passive actuators 106 (e.g., as shown in FIG. 7). The composite sheet 302 is securely held by the gripper 118 of each one of the plurality of passive actuators 106.

As illustrated in FIG. 7, in one or more examples, according to the method 1000, the layup surface 210 includes at least one contour, has a nonplanar configuration, or has another complex geometry. As an example, the layup surface 210 includes the first layup-surface portion 212 and the second layup-surface portion 214. The second layup-surface portion 214 is noncoplanar with the first layup-surface portion 212.

Referring again to FIG. 23, in one or more examples, the method 1000 includes a step of (block 1004) placing the first sheet portion 304 of the composite sheet 302 against the first layup-surface portion 212 of the layup surface 210 (e.g., as shown in FIG. 8). The method 1000 includes a step of (block 1006) passively retracting a first portion of the plurality of passive actuators 106 in response to engagement of the first sheet portion 304 with the first layup-surface portion 212 (e.g., as shown in FIG. 8). The first portion of the plurality of passive actuators 106 freely retract in response to engagement of the gripper 118 with the layup surface 210 when placing the first sheet portion 304 of the composite sheet 302 against the first layup-surface portion 212 of the layup surface 210.

In one or more examples, the method 1000 includes a step of (block 1008) placing the second sheet portion 306 of the composite sheet 302 against the second layup-surface portion 214 of the layup surface 210 (e.g., as shown in FIG. 9). The method 1000 includes a step of (block 1010) passively retracting a second portion of the plurality of passive actuators 106 in response to engagement of the second sheet portion 306 with the second layup-surface portion 214 (e.g., as shown in FIG. 9). The second portion of the plurality of passive actuators 106 freely retract in response to engagement of the gripper 118 with the layup surface 210 when placing the second sheet portion 306 of the composite sheet 302 against the second layup-surface portion 214 of the layup surface 210.

Accordingly, during placing and shaping of the composite sheet 302 against the layup surface 210, each one of the plurality of passive actuators 106 has a retracted length sufficient to facilitate draping and shaping the composite sheet 302 over the various contours of the layup surface 210

(e.g., as shown in FIG. 9). It can be appreciated that the greater the contour of the layup surface 210, the greater the differences in retracted lengths between different ones of the plurality passive actuators 106.

In one or more examples, the method 1000 includes a step of biasing the first portion of the plurality of passive actuators 106 against the first layup-surface portion 212 of the layup surface 210. The method 1000 includes a step of biasing the second portion of the plurality of passive actuators 106 against the second layup-surface portion 214 of the layup surface 210. Biasing the first portion of the plurality of passive actuators 106 against the first layup-surface portion 212 and biasing the second portion of the plurality of passive actuators 106 against the second layup-surface portion 214 of the layup surface 210 applies a predetermined force for shaping the composite sheet 302 over the contour of the layup surface 210.

In one or more examples, the method 1000 includes a step of (block 1012) locking the first portion of the plurality of passive actuators 106 to prevent extension of the first portion of the plurality of passive actuators 106. The method 1000 includes a step of (block 1014) locking the second portion of the plurality of passive actuators 106 to prevent extension of the second portion of the plurality of passive actuators 106.

It should be appreciated that, in one or more examples, the step of the step of (block 1012) locking the first portion of the plurality of passive actuators 106 to prevent extension of the first portion of the plurality of passive actuators 106 occurs as a result of the step of (block 1006) passively retracting a first portion of the plurality of passive actuators 106 in response to engagement of the first sheet portion 304 with the first layup-surface portion 212. As an example, step of (block 1006) passively retracting a first portion of the plurality of passive actuators 106 and the step of (block 1012) locking the first portion of the plurality of passive actuators 106 occur substantially concurrently. As an example, locking the first portion of the plurality of passive actuators 106 (block 1012) occurs automatically, for example, via the locking features of the collars 108, in response to passively retracting the first portion of the plurality of passive actuators 106 (block 1006).

Similarly, it should be appreciated that, in one or more examples, the step of (block 1014) locking the second portion of the plurality of passive actuators 106 to prevent extension of the second portion of the plurality of passive actuators 106 occurs as a result of the step of (block 1010) passively retracting a second portion of the plurality of passive actuators 106 in response to engagement of the second sheet portion 306 with the second layup-surface portion 214. As an example, the step of (block 1010) passively retracting a second portion of the plurality of passive actuators 106 and the step of (block 1014) locking the second portion of the plurality of passive actuators 106 occur substantially concurrently. As an example, locking the second portion of the plurality of passive actuators 106 (block 1014) occurs automatically, for example, via the locking features of the collars 108, in response to passively retracting a second portion of the plurality of passive actuators 106 (block 1010).

In one or more examples, according to the method 1000, the composite sheet 302 is held by the plurality of passive actuators 106 in a planar configuration before the step of (block 1004) placing the first sheet portion 304 of the composite sheet 302 against the first layup-surface portion 212 of the layup surface 210 and the step of (block 1008) placing the second sheet portion 306 of the composite sheet 302 against the second layup-surface portion 214 of the layup surface 210 (e.g., as shown in FIG. 7)

In one or more examples, according to the method 1000, the composite sheet 302 is held by the plurality of passive actuators 106 in a nonplanar configuration before the step of (block 1004) placing the first sheet portion 304 of the composite sheet 302 against the first layup-surface portion 212 of the layup surface 210 the step of (block 1008) placing the second sheet portion 306 of the composite sheet 302 against the second layup-surface portion 214 of the layup surface 210 (e.g., as shown in FIG. 12).

In one or more examples, the method 1000 includes a step of linearly moving at least one of the first portion of the plurality of passive actuators 106 in response to engagement of the first sheet portion 304 with the first layup-surface portion 212 (e.g., as shown in FIG. 11). The method 1000 includes a step of linearly moving at least one of the second portion of the plurality of passive actuators 106 in response to engagement of the second sheet portion 306 with the second layup-surface portion 214 (e.g., as shown in FIG. 11).

In one or more examples, the method 1000 includes a step of rotationally moving at least one of the first portion of the plurality of passive actuators 106 in response to engagement of the first sheet portion 304 with the first layup-surface portion 212 (e.g., as shown in FIG. 11). The method 1000 includes a step of rotationally moving at least one of the second portion of the plurality of passive actuators 106 in response to engagement of the second sheet portion 306 with the second layup-surface portion 214 (e.g., as shown in FIG. 11).

In one or more examples, the method 1000 includes a step of moving the plurality of passive actuators 106 towards the layup surface 210 to place the first sheet portion 304 of the composite sheet 302 against the first layup-surface portion 212 of the layup surface 210 (e.g., block 1004) and to passively retract the first portion of the plurality of passive actuators 106 (e.g., block 1006). The method 1000 includes a step of further moving the plurality of passive actuators 106 towards the layup surface 210 to place the second sheet portion 306 of the composite sheet 302 against the second layup-surface portion 214 of the layup surface 210 (e.g., block 1008) and to passively retract the second portion of the plurality of passive actuators 106 (e.g., block 1010).

In one or more examples, the method 1000 includes a step of moving the layup surface 210 towards the plurality of passive actuators 106 to place the first sheet portion 304 of the composite sheet 302 against the first layup-surface portion 212 of the layup surface 210 (e.g., block 1004) and to passively retract the first portion of the plurality of passive actuators 106 (e.g., block 1006). The method 1000 includes a step of further moving the layup surface 210 towards the plurality of passive actuators 106 to place the second sheet portion 306 of the composite sheet 302 against the second layup-surface portion 214 of the layup surface 210 (e.g., block 1008) and to passively retract the second portion of the plurality of passive actuators 106 (e.g., block 1010).

In one or more examples, the method 1000 includes a step of (block 1016) releasing the composite sheet 302 from the plurality of passive actuators 106 (e.g., as shown in FIG. 10).

In one or more examples, the method 1000 includes a step of (block 1018) resetting each one of the plurality of passive actuators 106. In one or more examples, the step of (block 1018) resetting each one of the plurality of passive actuators 106 includes a step of returning each one of the plurality of passive actuators 106 to the extended position. In one or more examples, the step of (block 1018) resetting each one of the plurality of passive actuators 106 includes a step of recentering each one of the plurality of passive actuators 106.

Figure 24:
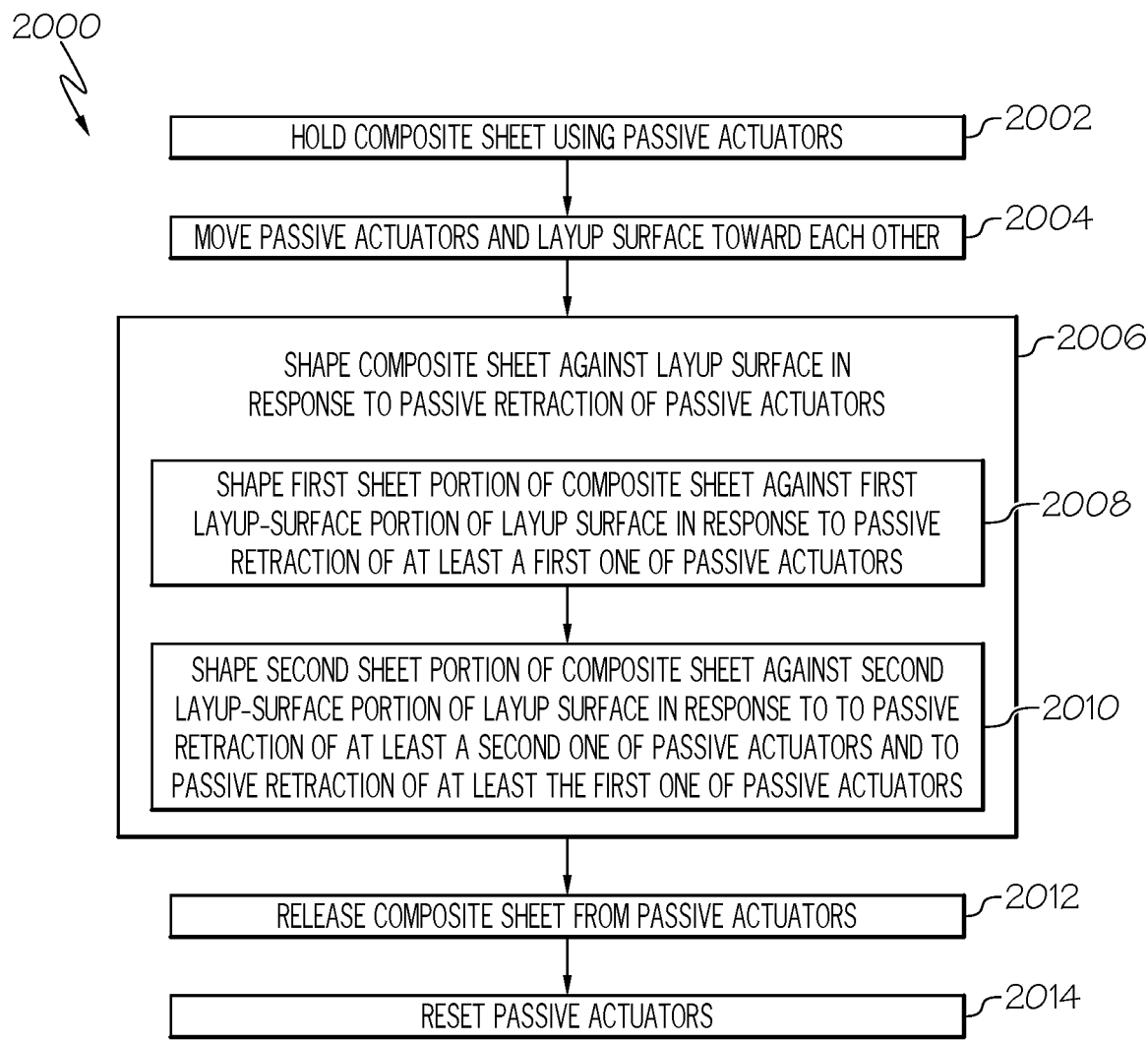
FIG. 24 is a flow diagram of an example of a method for shaping a composite layup.

Referring generally to FIGS. 1-22 and particularly to FIG. 24, the present disclosure is also directed to examples of a method 2000 for shaping the composite layup 300. In one or more examples, the method 2000 is implemented using the apparatus 100. In one or more examples, the method 2000 is implemented using the system 200.

Referring to FIG. 24, in one or more examples, the method 2000 includes a step of (block 2002) holding the composite sheet 302 over the layup surface 210 using the plurality of passive actuators 106. Each one of the plurality of passive actuators 306 has an extended length EL (e.g., as shown in FIG. 7). In one or more examples, the step of (block 2002) holding the composite sheet 302 is an example of the step of (block 1002) holding the composite sheet 302 of the method 1000.

In one or more examples, the method 2000 includes a step of (block 2004) moving the plurality of passive actuators 106 and the layup surface 210 toward each other. Moving the plurality of passive actuators 106 and the layup surface 210 toward each other places the composite sheet 302 against the layup surface 210. In one or more examples, the apparatus 100 (e.g., the support platform 104 and the plurality of passive actuators 106) and the composite sheet 302 are moved toward the layup surface 210. In one or more examples, the layup surface 210 is moved toward the apparatus 100 (e.g., the support platform 104 and the plurality of passive actuators 106) and the composite sheet 302.

In one or more examples, the method 2000 includes a step of (block 2006) shaping the composite sheet 302 against the layup surface 210 in response to passive retraction of the plurality of passive actuators 106 from the extended length EL to a retracted length RL (e.g., as shown in FIGS. 8 and 9).

In one or more examples, according to the method 2000, the step of (block 2006) shaping the composite sheet 302 against the layup surface 210 includes a step of (block 2008) shaping the first sheet portion 304 of the composite sheet 302 against the first layup-surface portion 212 of the layup surface 210, using at least a first one of the plurality of passive actuators 106 (e.g., the first passive actuator 106A), in response to passive retraction of at least the first one of the plurality of passive actuators 106 from the extended length EL to a first retracted length RL1 (e.g., as shown in FIGS. 7 and 8).

In one or more examples, the step of (block 2008) shaping the first sheet portion 304 of the composite sheet 302 against the first layup-surface portion 212 of the layup surface 210 is an example of the step of (block 1004) placing the first sheet portion 304 of the composite sheet 302 against the first layup-surface portion 212 of the layup surface 210 and the step of (block 1006) passively retracting the first portion of the plurality of passive actuators 106 of the method 1000.

Generally, as illustrated in FIG. 8, the first retracted length RL1 of at least the first one of the plurality of passive actuators 106 (e.g., the first passive actuator 106A) is less than the extended length EL of at least the first one of the plurality of passive actuators 106 (e.g., the first passive actuator 106A).

In one or more examples, according to the method 2000, the step of (block 2006) shaping the composite sheet 302 against the layup surface 210 also includes a step of (block 2010) shaping the second sheet portion 306 of the composite sheet 302 against the second layup-surface portion 214 of the layup surface 210, using at least a second one of the plurality of passive actuators 106 (e.g., the second passive actuator 106B), in response to passive retraction of at least the second one of the plurality of passive actuators 106 from the extended length EL to a second retracted length RL2 and passive retraction of at least the first one of the plurality of passive actuators 106 from the first retracted length RL1 to a third retracted length RL3 (e.g., as shown in FIGS. 8 and 9).

In one or more examples, the step of (block 2010) shaping the second sheet portion 306 of the composite sheet 302 against the second layup-surface portion 214 of the layup surface 210 is an example of the step of the step of (block 1006) passively retracting the first portion of the plurality of passive actuators 106, the step of (block 1008) placing the second sheet portion 306 of the composite sheet 302 against the second layup-surface portion 214 of the layup surface 210, and the step of (block 1010) passively retracting the second portion of the plurality of passive actuators 106 of the method 1000.

Generally, as illustrated in FIG. 9, the second retracted length RL2 of at least the second one of the plurality of passive actuators 106 (e.g., the second passive actuator 106B) is less than the extended length EL of at least the second one of the plurality of passive actuators 106 (e.g., the second passive actuator 106B). The third retracted length RL3 of at least the first one of the plurality of passive actuators 106 (e.g., the first passive actuator 106A) is less than the first retracted length RL1 of at least the first one of the plurality of passive actuators 106 (e.g., the first passive actuator 106A). The third retracted length RL3 of at least the first one of the plurality of passive actuators 106 (e.g., the first passive actuator 106A) is less than the second retracted length RL2 of at least the second one of the plurality of passive actuators 106 (e.g., the second passive actuator 106B).

In one or more examples, the method 2000 includes a step of (block 2012) releasing the composite sheet 302 (e.g., as shown in FIG. 10).

In one or more examples, the method 2000 includes a step of (block 2014) resetting each one of the plurality of passive actuators 106. In one or more examples, the step of (block 2014) resetting each one of the plurality of passive actuators 106 includes a step of returning each one of the plurality of passive actuators 106 to the extended length EL. In one or more examples, the step of (block 2014) resetting each one of the plurality of passive actuators 106 includes a step of recentering each one of the plurality of passive actuators 106 (e.g., as shown in FIGS. 15 and 16 and FIGS. 19 and 20).

Figure 25:
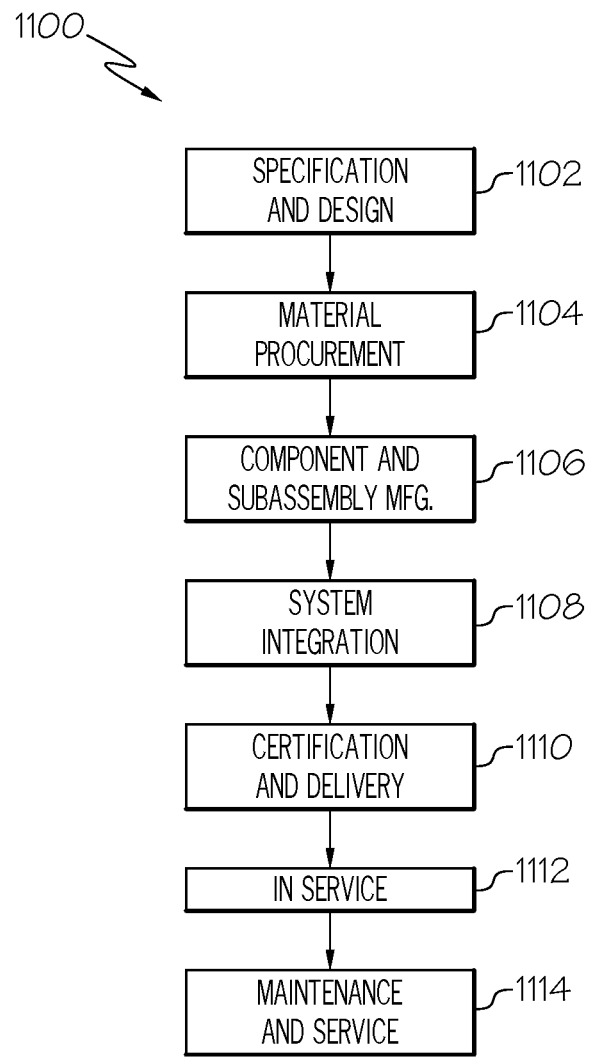
FIG. 25 is a flow diagram of an example of an aircraft manufacturing and service method.
Figure 26:
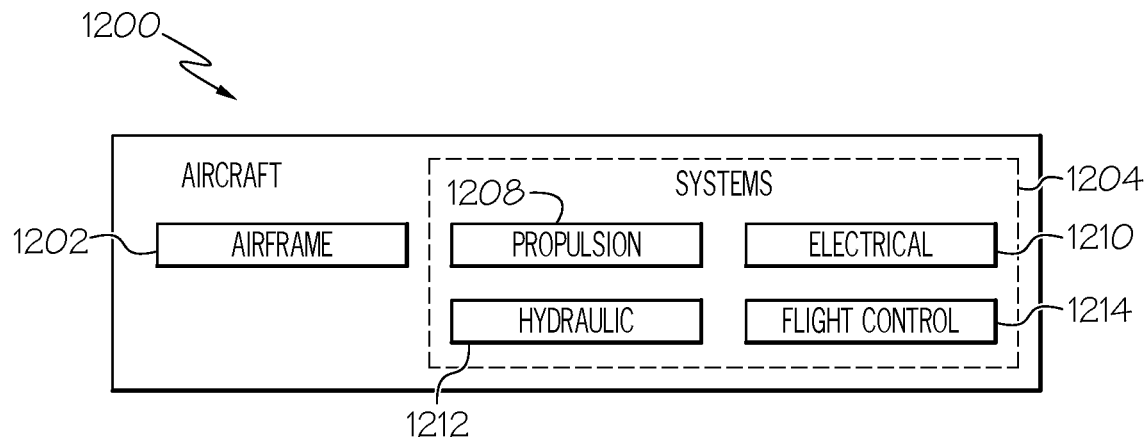
FIG. 26 is a schematic illustration of an example of an aircraft.

Referring now to FIGS. 25 and 26, examples of the apparatus 100, the passive actuator 106, the system 200, the method 1000, and the method 2000 may be related to, or used in the context of, an aircraft manufacturing and service method 1100, as shown in the flow diagram of FIG. 25 and an aircraft 1200, as schematically illustrated in FIG. 26. For example, the aircraft 1200 and/or the aircraft production and service method 1100 may utilize the apparatus 100, the system 200, the method 1000, and the method 2000 for fabricating composite laminate structures of the aircraft 1200.

Referring to FIG. 26, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a flight control system, a communication system, a guidance system, a weapons system, and the like. In one or more examples, a portion of the airframe 1202 (e.g., fuselage, wing, tail section, etc.) includes a composite laminate structure made using the apparatus 100 and/or system 200 or fabricate according to the method 1000 or the method 2000.

Referring to FIG. 25, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 25 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the apparatus 100, the passive actuator 106, the system 200, the method 1000, and the method 2000 shown and described herein, may be employed during any one or more of the stages of the manufacturing and service method 1100 shown in the flow diagram illustrated by FIG. 25. In an example, a composite laminate structure fabricated using the apparatus 100, the passive actuator 106, and/or the system 200 or according to the method 1000 or the method 2000 may form a portion of component and subassembly manufacturing (block 1106) and/or system integration (block 1108). Further, a composite laminate structure fabricated using the apparatus 100, the passive actuator 106, and/or the system 200 or according to the method 1000 or the method 2000 may be utilized in a manner similar to components or subassemblies prepared while the aircraft 1200 is in service (block 1112). Also, a composite laminate structure fabricated using the apparatus 100, the passive actuator 106, and/or the system 200 or according to the method 1000 or the method 2000 may be utilized during system integration (block 1108) and certification and delivery (block 1110) Similarly, a composite laminate structure fabricated using the apparatus 100, the passive actuator 106, and/or the system 200 or according to the method 1000 or the method 2000 may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite laminate structures used for other types of vehicles (e.g., land vehicles, marine vehicles, space vehicles, etc.), and stand-alone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-22 and 26, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-22 and 26, referred to above, need be included in every example and not all elements, features, and/or components described herein are necessarily depicted in each illustrative example. Accordingly, some of the elements, features, and/or components described and illustrated in FIGS. 1-22 and 26 may be combined in various ways without the need to include other features described and illustrated in FIGS. 1-22 and 26, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-22 and 26, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-22 and 26, and such elements, features, and/or components may not be discussed in detail herein with reference to each of FIGS. 1-22 and 26. Similarly, all elements, features, and/or components may not be labeled in each of FIGS. 1-22 and 26, but reference numerals associated therewith may be utilized herein for consistency.

In FIGS. 23-25, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 23-25 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the apparatus 100, the passive actuator 106, the system 200, the method 1000, and the method 2000 have been shown and described, modifications may occur to those skilled in the art upon reading the specification. The present application includes such modifications and is limited only by the scope of the claims.

What is claimed is:

1. An apparatus for applying a composite layup, the apparatus comprising:
   a support platform;
   a passive actuator comprising:
      a housing coupled to the support platform;
      a tubular collar situated in the housing;
      a shaft extending through the collar and comprising a first shaft end and a second shaft end, opposite the first shaft end;
      a gripper coupled to the second shaft end,
   wherein:
      the shaft is freely movable relative to the collar in a first direction along an axis of linear shaft movement; and
      movement of the shaft relative to the collar in the first direction automatically locks the collar to the shaft such that movement of the shaft relative to the collar in a second direction, opposite the first direction, along the axis of linear shaft movement is inhibited.

2. The apparatus of claim 1, wherein movement of the shaft in the second direction is selectively enabled.

3. The apparatus of claim 1, wherein the collar selectively releases the shaft to enable linear movement of the shaft in the second direction.

4. The apparatus of claim 1, wherein
   the support platform comprises:
      a frame; and
      a rail coupled to the frame;

the housing of the passive actuator is coupled to the rail; and
the housing of the passive actuator is linearly movable relative to the rail along an axis of linear housing movement that extends along the rail.

5. The apparatus of claim 1, wherein:
the support platform comprises:
a frame; and
a plate assembly coupled to the frame and comprising a plate opening; and
a portion of the housing of the passive actuator is situated in the plate opening.

6. The apparatus of claim 5, wherein the housing of the passive actuator is linearly movable in the plate opening and relative to the plate assembly in at least one direction that is parallel to a plane that extends through the plate opening.

7. The apparatus of claim 5, wherein the housing of the passive actuator is biased to a center position within the plate opening.

8. The apparatus of claim 5, wherein the housing of the passive actuator comprises an annular tapered surface that is situated in and that centers the housing in the plate opening.

9. The apparatus of claim 1, wherein the shaft is biased in the second direction along the axis of linear shaft movement.

10. The apparatus of claim 1, wherein:
the collar comprises:
a tubular collar body coupled to the housing; and
a tubular collar lock coupled to the collar body;
the shaft extends though the collar body and the collar lock;
the collar lock is movable along the axis of linear shaft movement relative to the collar body between an unlocked position, in which the collar lock is disengaged from the shaft to permit movement of the shaft in the second direction, and a locked position, in which the collar lock is engaged with the shaft to inhibit movement of the shaft in the second direction; and
movement of the shaft in the first direction moves the collar lock to the locked position.

11. The apparatus of claim 1, wherein the passive actuator further comprises a spring coupled to the shaft and to the housing such that the spring biases the second shaft end in the second direction along the axis of linear shaft movement.

12. A passive actuator comprising:
a housing;
a tubular collar coupled to the housing;
a shaft extending through the collar; and
a gripper coupled to the shaft,
wherein:
the collar automatically locks in response to linear movement of the shaft in a first direction along an axis of linear shaft movement;
with the collar locked, the collar enables further linear movement of the shaft in the first direction and inhibits linear movement of the shaft in a second direction, opposite the first direction, along the axis of linear shaft movement; and
the collar is selectively unlockable to enable linear movement of the shaft in the second direction.

13. A system for applying a composite layup, the system comprising:
a tool comprising a tool surface;
a support platform that is positionable relative to the tool surface; and
a plurality of passive actuators, wherein each one of the plurality of passive actuators comprises:
a housing coupled to the support platform;
a tubular collar situated in the housing;
a shaft extending through the collar and comprising a first shaft end and a second shaft end, opposite the first shaft end; and
a gripper coupled to the second shaft end,
wherein:
the shaft of at least one of the plurality of passive actuators is freely movable relative to the collar of the at least one of the plurality of passive actuators in a first direction along an axis of linear shaft movement in response to engagement of the gripper of the at least one of the plurality of passive actuators with the tool surface; and
movement of the shaft of the at least one of the plurality of passive actuators relative to the collar of the at least one of the plurality of passive actuators in the first direction automatically locks the collar of the at least one of the plurality of passive actuators to the shaft of the at least one of the plurality of passive actuators such that movement of the shaft of the at least one of the plurality of passive actuators relative to the collar in a second direction, opposite the first direction, along the axis of linear shaft movement is inhibited.

14. The system of claim 13, wherein movement of the shaft in the second direction is selectively enabled.

15. The system of claim 13, wherein:
the tool surface comprises a first tool-surface portion and a second tool-surface portion; and
the second tool-surface portion is noncoplanar with the first tool-surface portion.

16. The system of claim 13, wherein:
the support platform comprises a plate comprising a plurality of plate openings; and
a portion of the housing of each one of the plurality of passive actuators is situated in a corresponding one of the plurality of plate openings; and
the housing of at least one of the plurality of passive actuators is linearly movable in a corresponding one of the plurality of plate openings and relative to the plate in at least one direction that is parallel to a plane that extends through the corresponding one of the plurality of plate openings.

17. The system of claim 16, wherein the housing of at least one of the plurality of passive actuators is biased to a center position within a corresponding one of the plurality of plate openings.

18. A method for applying a composite layup, the method comprising steps of:
holding a composite sheet over a layup surface using a plurality of passive actuators, wherein:
each one of the a plurality of passive actuators comprises:
a housing coupled to a support platform;
a tubular collar coupled to the housing;
a shaft extending through the collar; and
a gripper coupled to the shaft;
the shaft of at least one of the plurality of passive actuators is freely movable relative to the collar of at least one of the plurality of passive actuators in a first direction along an axis of linear shaft movement;
movement of the shaft of the at least one of the plurality of passive actuators relative to the collar of the at least one of the plurality of passive actuators in the first direction automatically locks the collar of the at least one of the plurality of passive actuators to the shaft of the at least one of the plurality of passive actuators such that movement of the shaft of the at least one of the plurality of passive actuators relative to the collar of the at least one of the plurality of passive actuators in a second direction, opposite the first direction, along the axis of linear shaft movement is inhibited; and the layup surface comprises:
  a first layup-surface portion; and
  a second layup-surface portion that is noncoplanar with the first layup-surface portion;

placing a first sheet portion of the composite sheet against the first layup-surface portion of the layup surface;

passively retracting the shaft of a first portion of the plurality of passive actuators in the first direction relative to the collar of the first portion of the plurality of passive actuators in response to engagement of the first sheet portion with the first layup-surface portion;

placing a second sheet portion of the composite sheet against the second layup-surface portion of the layup surface; and passively retracting the shaft of a second portion of the plurality of passive actuators in the first direction relative to the collar of the second portion of the plurality of passive actuators in response to engagement of the second sheet portion with the second layup-surface portion.

19. The method of claim 18, further comprising:
biasing the first portion of the plurality of passive actuators against the first layup-surface portion of the layup surface; and
biasing the second portion of the plurality of passive actuators against the second layup-surface portion of the layup surface.

20. The method of claim 18, further comprising locking the shaft relative to the collar of the first portion of the plurality of passive actuators to prevent extension of the shaft of the first portion of the plurality of passive actuators.

21. The method of claim 20, further comprising locking the shaft relative to the collar of the second portion of the plurality of passive actuators to prevent extension of the shaft of the second portion of the plurality of passive actuators.

22. A method for shaping a composite layup, the method comprising steps of:
holding a composite sheet over a layup surface using a plurality of passive actuators, wherein each one of the plurality of passive actuators comprises a housing coupled to a support platform, a tubular collar coupled to the housing, a shaft extending through the collar, and a gripper coupled to the shaft, wherein the shaft of at least one of the plurality of passive actuators is freely movable relative to the collar of the at least one of the plurality of passive actuators in a first direction along an axis of linear shaft movement and movement of the shaft of the at least one of the plurality of passive actuators relative to the collar of the at least one of the plurality of passive actuators in the first direction automatically locks the collar of the at least one of the plurality of passive actuators to the shaft of the at least one of the plurality of passive actuators such that movement of the shaft of the at least one of the plurality of passive actuators relative to the collar of the at least one of the plurality of passive actuators in a second direction, opposite the first direction, along the axis of linear shaft movement is inhibited;

moving the plurality of passive actuators and the layup surface toward each other; and shaping the composite sheet against the layup surface in response to passive retraction of the shaft of the at least one of the plurality of passive actuators relative to the collar of the at least one of the plurality of passive actuators from an extended length to a retracted length.

23. The method of claim 22, wherein:
the layup surface comprises a first layup-surface portion; and
the step of shaping the composite sheet against the layup surface comprises shaping a first sheet portion of the composite sheet against the first layup-surface portion of the layup surface in response to passive retraction of at least a first one of the plurality of passive actuators from the extended length to a first retracted length.

24. The method of claim 23, wherein:
the layup surface further comprises a second layup-surface portion that is noncoplanar with the first layup-surface portion; and
the step of shaping the composite sheet against the layup surface further comprises shaping a second sheet portion of the composite sheet against the second layup-surface portion of the layup surface in response to passive retraction of at least a second one of the plurality of passive actuators from the extended length to a second retracted length and passive retraction of at least the first one of the plurality of passive actuators from the first retracted length to a third retracted length.

* * * * *